United States Patent [19]

McSpadden et al.

[11] Patent Number: 4,876,653
[45] Date of Patent: Oct. 24, 1989

[54] PROGRAMMABLE MULTIPLE BLENDER

[76] Inventors: John S. McSpadden, 1008 Wharton St.; Russel D. Leatherman, 8P Woodstream La., both of Greensboro, N.C. 27410; Harold R. Young, 1489 Old Coach Rd., Kernersville, N.C. 27284

[21] Appl. No.: 73,974

[22] Filed: Jul. 15, 1987

[51] Int. Cl.[4] .............................................. G05D 11/13
[52] U.S. Cl. ..................................... 364/479; 364/173; 364/502; 364/510; 366/152; 137/3; 137/88; 137/101.19; 222/26; 222/55
[58] Field of Search ............... 364/479, 173, 500, 502, 364/510; 366/152; 137/101.19, 88, 3; 222/26, 52, 55, 57

[56] References Cited

U.S. PATENT DOCUMENTS

| 3,229,077 | 1/1966 | Gross | 364/502 |
|---|---|---|---|
| 3,410,293 | 11/1968 | Ernyei | 137/112 |
| 3,473,008 | 10/1969 | Bay et al. | 364/502 |
| 3,475,392 | 10/1969 | McCoy et al. | 364/502 |
| 3,717,283 | 2/1973 | Gulbrandsen | 222/76 |
| 3,747,624 | 7/1973 | Young | 222/26 |
| 3,756,463 | 9/1973 | Gravina | 222/26 |
| 3,777,935 | 12/1973 | Storey | 364/173 |
| 3,847,302 | 11/1974 | Krone et al. | 222/28 |
| 3,940,600 | 2/1976 | Alexander et al. | 364/173 |
| 4,019,653 | 4/1977 | Scherer et al. | 222/52 |
| 4,043,300 | 8/1977 | Lombard | 137/101.19 |
| 4,083,473 | 4/1978 | Goodwin et al. | 222/26 |
| 4,150,767 | 4/1979 | Pitches et al. | 222/57 |
| 4,252,253 | 2/1981 | Shannon | 222/26 |
| 4,265,266 | 5/1981 | Kierbow et al. | 137/101.19 |
| 4,279,999 | 7/1981 | Reichenberger | 364/479 |
| 4,333,356 | 1/1982 | Bartels et al. | 364/502 |
| 4,345,612 | 8/1982 | Koni et al. | 137/101.19 |
| 4,353,482 | 10/1982 | Tomlinson et al. | 364/479 |
| 4,420,008 | 12/1983 | Shu | 364/509 |
| 4,433,701 | 2/1984 | Cox et al. | 137/101.19 |
| 4,440,314 | 4/1984 | Vetter et al. | 137/101.19 |
| 4,482,969 | 11/1984 | Funk et al. | 364/500 |
| 4,494,209 | 1/1985 | Agarwal | 364/502 |
| 4,527,245 | 7/1985 | Axelson et al. | 364/479 |
| 4,538,221 | 8/1985 | Crain et al. | 364/502 |
| 4,538,222 | 8/1985 | Crain et al. | 364/510 |

FOREIGN PATENT DOCUMENTS

| 0211612 | 2/1987 | European Pat. Off. |
| 2646466 | 4/1977 | Fed. Rep. of Germany |
| 1513520 | 6/1978 | United Kingdom |
| 2053512 | 2/1981 | United Kingdom |

Primary Examiner—John R. Lastova
Attorney, Agent, or Firm—Kenneth Watov; Stefan J. Klauber; David A. Jackson

[57] ABSTRACT

A system for blending low and high octane gasoline includes independent flow paths for each fuel between a supply source and a composite blend manifold and nozzle assembly, with the rate of flow of fuel in each flow path being under individual closed loop control, under an algorithm for comparing the ratio of the actual accumulated volumes of the low octane to the high octane fuel, relative to a statistically determined ratio of the ideal volume of said low to high octane fuel for the total actual accumulated volume of the sum of the volumes of the fuels at a given time, for providing a perfect blend relative to a preselected blend ratio.

31 Claims, 31 Drawing Sheets

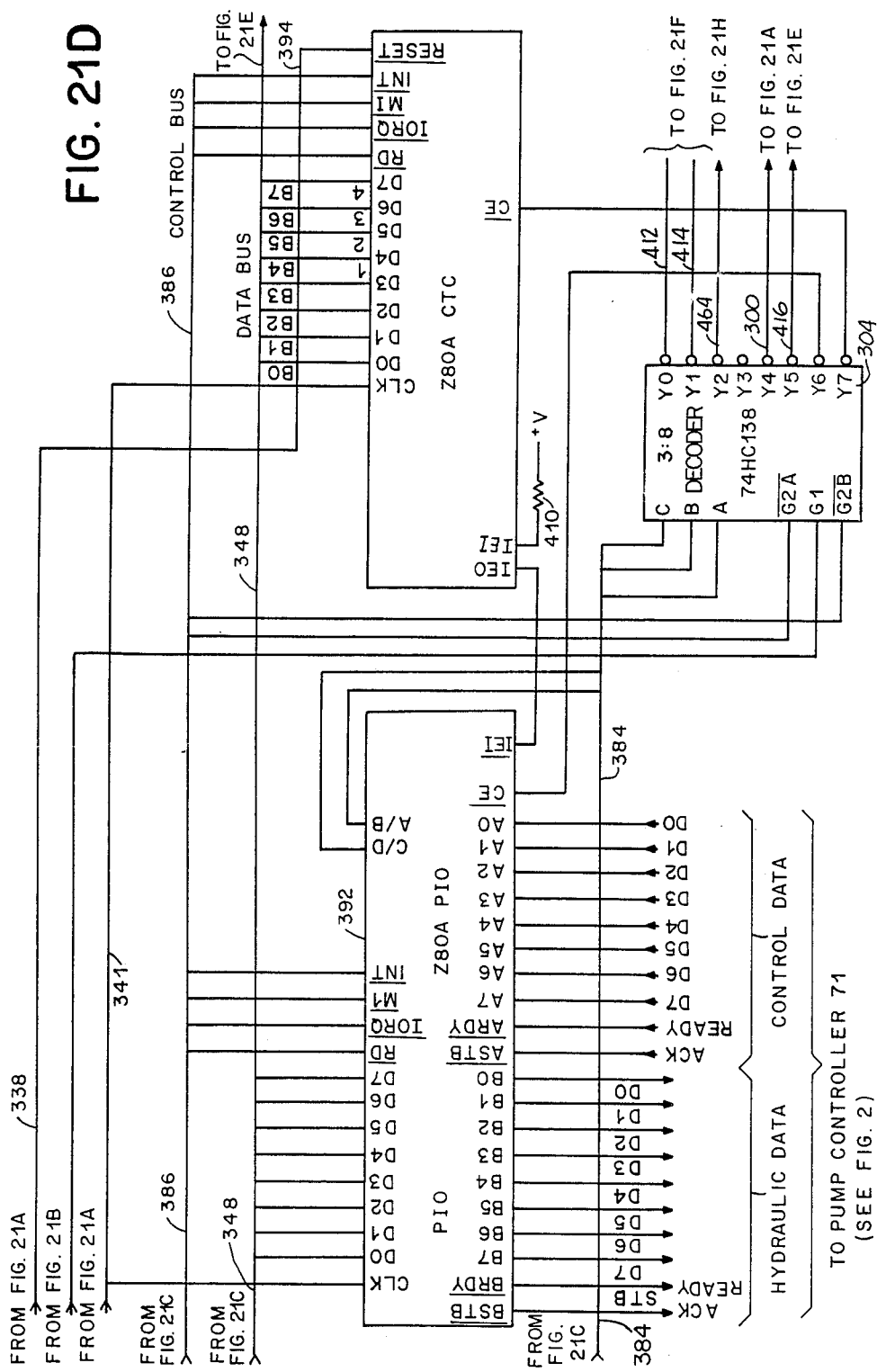

| 71 | STANDARD PUMP CONTROLLER NOMENCLATURE | CORRESPONDING BLENDER NOMENCLATURE | 73 |
|---|---|---|---|
| → 1 > | SLOWDOWN VALVE A1 | CONTROL DATA OUT D0 | < 1 ← |
| → 2 > | | | < 2 ← |
| → 3 > | SLOWDOWN VALVE A2 | CONTROL DATA OUT D1 | < 3 ← |
| → 4 > | | | < 4 ← |
| → 5 > | SLOWDOWN VALVE A3 | CONTROL DATA OUT D2 | < 5 ← |
| → 6 > | | | < 6 ← |
| → 7 > | SLOWDOWN VALVE A4 | CONTROL DATA OUT D3 | < 7 ← |
| → 8 > | | | < 8 ← |
| → 9 > | MAIN VALVE A1 | CONTROL DATA OUT D4 | < 9 ← |
| → 10 > | | | < 10 ← |
| → 11 > | MAIN VALVE A2 | CONTROL DATA OUT D5 | < 11 ← |
| → 12 > | | | < 12 ← |
| → 13 > | MAIN VALVE A3 | CONTROL DATA OUT D6 | < 13 ← |
| → 14 > | | | < 14 ← |
| → 15 > | MAIN VALVE A4 | CONTROL DATA OUT D7 | < 15 ← |
| → 16 > | | | < 16 ← |
| → 17 > | PULSER INPUT DATA A4 | HYD DATA OUT D7 | < 17 ← |
| → 18 > | | | < 18 ← |
| → 19 > | PULSER INPUT DATA A4 | HYD DATA OUT D6 | < 19 ← NC |
| → 20 > | | | < 20 ← |
| → 21 > | PULSER INPUT DATA A3 | HYD DATA OUT D5 | < 21 ← |
| → 22 > | | | < 22 ← |
| → 23 > | PULSER INPUT DATA A3 | HYD DATA OUT D4 | < 23 ← |
| → 24 > | | | < 24 ← |
| → 25 > | PULSER INPUT DATA A2 | HYD DATA OUT D3 | < 25 ← |
| → 26 > | | | < 26 ← |
| → 27 > | PULSER INPUT DATA A2 | HYD DATA OUT D2 | < 27 ← |
| → 28 > | | | < 28 ← |
| → 29 > | PULSER INPUT DATA A1 | HYD DATA OUT D1 | < 29 ← |
| → 30 > | PUMP HANDLE A1 | PUMP HANDLE OUT A1 | < 30 ← |
| → 31 > | PULSER INPUT DATA A1 | HYD DATA OUT D0 | < 31 ← |
| → 32 > | | | < 32 ← |
| → 33 > | | | < 33 ← NC |
| → 34 > | | | < 34 ← |
| → 35 > | | | < 35 ← NC |
| → 36 > | | | < 36 ← |
| → 37 > | | | < 37 ← NC |
| → 38 > | | | < 38 ← |
| → 39 > | | | < 39 ← NC |
| → 40 > | GND | | < 40 ← |
| → 41 > | +5V | +5V | < 41 ← |
| → 42 > | | | < 42 ← |
| → 43 > | | | < 43 ← |
| → 44 > | | | < 44 ← NC |
| → 45 > | | | < 45 ← NC |
| → 46 > | PULSER INPUT DATA B1 | HYD DATA READY (STB) | < 46 ← NC |
| → 47 > | | | < 47 ← |
| → 48 > | PULSER INPUT DATA B1 | CONTROL DATA (ACK) | < 48 ← NC |
| → 49 > | | | < 49 ← |
| → 50 > | STP 1 CONTROL | STP 1 CONTROL | < 50 ← NC |
| → 51 > | STP 2 CONTROL | | < 51 ← |
| → 52 > | | STP 3 CONTROL | < 52 ← |
| → 53 > | | | < 53 ← |
| → 54 > | | | < 54 ← |
| → 55 > | | | < 55 ← |
| → 56 > | SPARE | CONTROL DATA READY (STB) | < 56 ← |
| → 57 > | SPARE | HYD DATA (ACK) | < 57 ← |
| → 58 > | | | < 58 ← |
| → 59 > | | | < 59 ← NC |
| → 60 > | | | < 60 ← NC |

PROGRAMMABLE MULTIPLE BLENDER

FIELD OF THE INVENTION

The field of the present invention relates generally to dispensing systems for delivering a desired blend of two products to a user, and more particularly relates to such systems incorporating proportional flow control valves controlled by a closed loop system including a microprocessor programmed to effect control of the valves for delivering the desired blend of the two products.

BACKGROUND OF THE INVENTION

There are many prior dispensing apparatus for blending two or more fluids during the dispensing of a fluid product. For example, Krone, et al U.S. Pat. No. 3,847,302 teaches the activation of one or more valves via energization of associated solenoids for dispensing a desired blend or grade of gasoline. Krone does not appear to teach closed loop control of the, flow rates of the products making up the ultimate blended product, but utilizes pre-set valve openings.

Buchanan U.S. Pat. No. 3,895,738 discloses a blending system for blending two products together in order to obtain a desired product for dispensing. Buchanan individually sets the rates of flow of each one of the two products for accomplishing the required blending. No feedback or closed loop operation is evident in Buchanan.

Kierbow, et al U.S. Pat. No. 4,265,266 teaches the use of proportional control valves in a blending system, and uses closed loop control via a microprocesser for controlling the rate of flow of one of the two products being blending. The valves control hydraulic motors, which in turn control pumps for pumping the fluid.

Crain, et al U.S. Pat. No. 4,538,222 teaches a system for producing a fracturing fluid consisting of water and number of different additives, wherein a microprocessor is programmed to respond to the total flow of water and each additive, and to preselected concentration values for each additive for controlling the speed of pumps associated with each additive to maintain a desired concentration of each additive in the mixture. Cox, et al U.S. Pat. No. 4,433,701 teaches a polymer mixing system including closed loop control. Cox uses a micro-processor 8 to control a gear pump 10 as a function of the error between a "processed input" and a "set point input".

Vetter, et al U.S. Pat. No. 4,440,314 teaches the control of the "dosing of at least one fluid component of a mixture of fluids. Vetter uses closed loop control in order to maintain mixing accuracy. The flow rates of two components that are to be mixed are compared for controlling the flow rate of one of these components in order to maintain a desired mixture".

Koni, et al U.S. Pat. No. 4,345,612 teaches closed loop control for mixing two gases together in a desired ratio. The flow rates of each one of the gases are measured using a pair of flow rate sensors, respectively, in combination with a microprocessor controller for controlling the valves associated with each one of the gases.

Shannon U.S. Pat. No. 4,252,253 discloses a microprocessed drink dispenser system. Although a microprocessor is used in order to control this dispenser system, no use is made of closed loop control in order to enhance the accuracy of the drink mixtures.

Goodwin U.S. Pat. No. 4,083,473 discloses a system for blending that provides either a low octane fuel, a high octane fuel, or an intermediate octane fuel that is a blend of the latter two. The system includes flow meters for providing signals indicative of the rate of flow of the low octane and high octane fuels, respectively. A control unit is responsive to the signals for adjusting a blend control valve in closed loop fashion to provide a desired blend of the low and high octane fuels.

Lombard U.S. Pat. No. 4,043,300 discloses an apparatus and circuitry for comparing the flow rates of two fluids, such as air and fuel being delivered to an engine, for controlling a valve setting the flow rate of one of the fluids, in order to maintain a desired ratio of mixing of the fluids.

Gulbrandsen U.S. Pat. No. 3,717,283 discloses a gasoline blending apparatus including electrical circuitry and electromagnetic valving means for delivering either premium fuel, low octane fuel, or a blend of the two to a nozzle. The system disclosed does not include closed loop control, and is believed to teach the opening and closing of valves to deliver either one of the three selectable octane fuels, wherein the valves are either closed or open to a predetermined opening for the orifice of the valve.

Ernyei U.S. Pat. No. 3,410,293 discloses a "in-line blending" system including digital control means for controlling a valve 14 relative to an error signal in the flow rate of two products being blended. The flow rates of each one of the products are compared in order to derive an error signal from an idolized ratio for control of the valve 14.

Gross U.S. Pat. No. 3,229,077 teaches the use of a servo valve mechanism controlled by a digital-to-analog processor for controlling the rate of flow of one of the two products in order to obtain a desired blending. Chesuay U.S. Pat. No. 4,043,300 also shows blending control via adjusting the flow rate of one of two products.

SUMMARY OF THE INVENTION

An object of the present invention is to provide an improved blending system for a liquid product dispensing system.

Another object of the invention is to provide a dispensing system including a blending subsystem providing for the blending of two products into any number of programmed blends, with each blend being some desired ratio of the two products, typically ranging from 1:99 or 99:1, for example.

Still another object of the invention is to provide an improved blending system capable of dispensing multiple blends from a single nozzle.

Another object of the invention is to provide in a blending system the capability of varying the product flow rates of each one of two products individually in proportion to given respective electrical input signals.

Another object of the invention is to provide an improved microprocessor controlled blending system for blending two products into a product representative of some desired ratio of the products from a range of available ratios.

Yet another object of the invention is to provide a system for blending two products together into a desired ratio, via the modulation in real time of the flow control valves associated with each one of the products.

Another object of the invention is to minimize contamination of the blended product by insuring the blending together of the two products upstream from a nozzle.

Yet another object of the invention is to provide in a dispensing system the capability for controlling the ultimate product flow rate while maintaining a desired blend.

Another object of the invention is to provide in an improved blending system the capability for compensating for changes in inlet line pressure of each one of the products being blended via control of the respective valves for each product responsive to inlet line pressure, for maintaining both the desired blend and the product flow rate at predetermined programmed values.

With these and other objects in mind, the present invention includes flow control valve means for controlling the flow rate of each one of two products, flow meter means for providing electrical signals indicative of the flow rate of each one of the products flowing through the flow valve control means, blender manifold means for receiving the two products after the latter flow through their respective flow control valve means, for blending the two products together for providing an ultimate product for dispensing from a nozzle connected to an output port of the blend manifold means, and control means including microprocessor means programmed to respond to both a blend select signal and the product flow rate signals from the flow rate meter means, for providing dual closed loop control of the flow control valve means in a manner to maintain a desired blend of the two products being dispensed at a desired product flow rate.

BRIEF DESCRIPTION OF THE DRAWINGS

The various embodiments of the invention will be described in detail with reference to the drawings in which like items are indicated by the same reference number:

FIGS. 21A through 21H show a circuit and logic schematic diagram of the hydraulic interface board of one embodiment of the invention;

FIG. 22 shows an interconnection diagram between the pump controller board and hydraulic interface board of one embodiment of the invention;

DESCRIPTION OF THE PREFERRED EMBODIMENTS OF THE INVENTION

Figure 1:
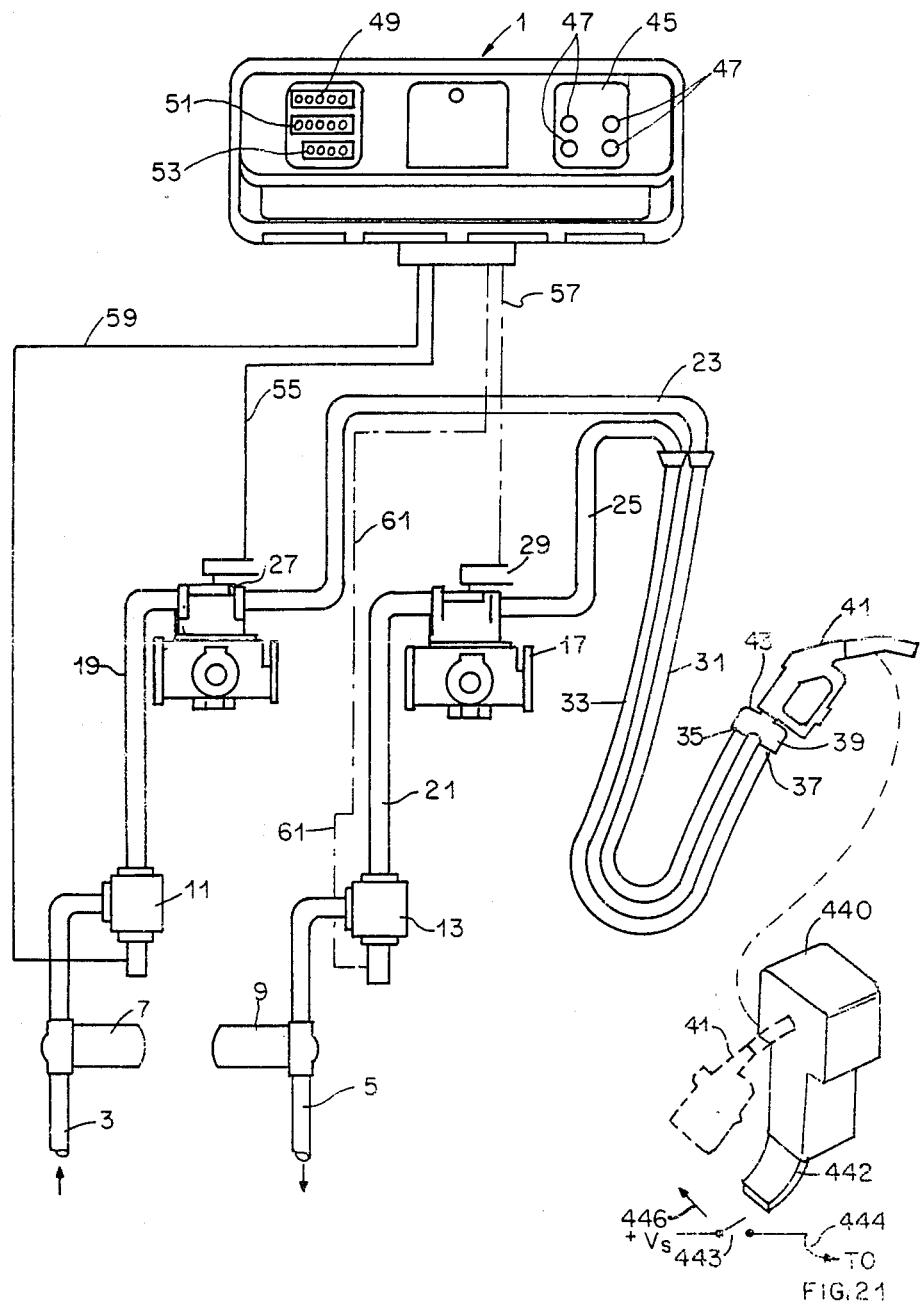
FIG. 1 is a pictorial drawing of one embodiment of the invention.

In FIG. 1, one embodiment of the present invention includes a control display module 1, first and second product delivery lines 3 and 5 for delivering products under pressure from a pump (not shown) through in-line filters 7 and 9, respectively, to a first flow control valve 11 for controlling and flow rate of the first product, and to a second flow control valve 13 for controlling the rate of flow of a second product, respectively, a flow meter 15 connected in line with the flow control valve 11 for providing an electrical signal indicative of the rate of flow of the first product, a second flow meter 178 connected in line with the flow control valve 13 for providing an electrical signal indicative of the rate of flow of the second product, a pair of coupling pipes or hoses 19, 21, for connecting flow control valve 11 to flow meter 15, and flow control valve 13 to flow meter 17, respectively, a pair of delivery pipes or hoses 23 and 25 connected to the outlet ports 27, 29, respectively of flow meters 15 and 17, respectively, a pair of flexible hoses 31, 33 connected to the outlet pipes or conduits 23, 25, respectively, the other ends of the hoses 31, 33 being connected to inlet ports 35, 37, respectively, of a blend manifold 39, and a nozzle 41 connected to an outlet port 43 of the blend manifold 39, as shown.

In this example, the control display module or panel 1 includes a blend selection section 45 providing a number of individually selectable switches 47 for selecting a desired blend of the first product (such as a low octane fuel) and a second product (such as a high octane fuel), for dispensing from the nozzle 41 typically into the gasoline tank of an automobile, for example. Also included on the illustrative control panel 1 is an electronic readout 49 for displaying the price per unit volume of the product dispensed from the nozzle 41, an electronic display 51 for displaying the volume or quantity of the product dispensed, and another electronic display 53 for showing the price per unit volume of the product selected on the blend selection panel 45, for example.

Note that the position of the series connected flow meter 15 and flow control valve 11 can be interchanged without any effect on system performance. Similarly, flow meter 17 can be interchanged in position with flow control valve 13. Note that various state, Federal, and other agency requirements may dictate the inclusion of additional valves, such as check valves and on/off solenoid valves, for example.

Electrical signals indicative of the flow rates of the first and second products are connected from the flow meters 27 and 29 via electrical cables 55 and 57, respectively, to the control/display module 1. Feedback control signals are carried from the control/display module 1 via electrical cables 59 and 61 to the flow control valves 11 and 13, respectively, for controlling in real time the rate of flow of the first and second products, respectively. Check valves (not shown) are typically included in the liquid product distribution lines, and in this example may be located either in the input ports 35 and 37 of the blend manifold 39, or elsewhere in the fluid path between the flow meters 15 and 17, and the nozzle 41, in this example.

Figure 2:
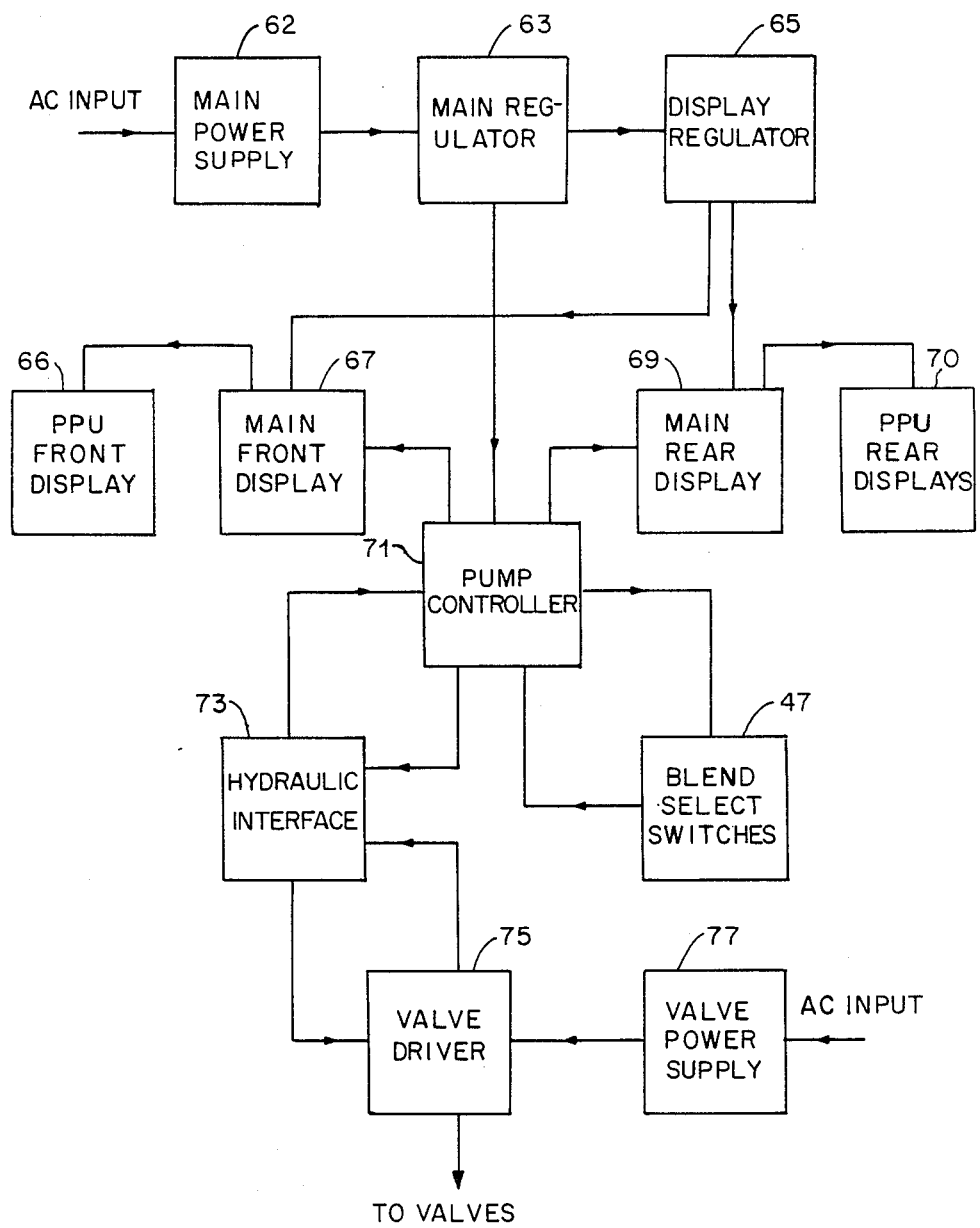
FIG. 2 is a system block diagram of an embodiment of the invention.

A block diagram of the basic system of one embodiment of the invention is shown in FIG. 2. The illustrative system includes a main power supply 62, including a step-down AC transformer (not shown), and an internal battery and circuitry (not shown) for supplying backup power in the event of failure of the AC line voltage. The main power supply 62 drives a main regulator 63 that includes a switching regulator and converter system (not shown), for example, for converting AC to DC. In this example, the DC output voltage from the main regulator 63 is typically 14.5 volts DC and 5 volts DC for operating the various electronic subsystems of the present dispenser. In turn, the main regulator 63 drives a display regulator or power supply 65, typically a DC-to-DC supply for converting 13.0 volts DC to 175.0 volts DC for operating various display elements, such as those associated with the blend selection panel 45, the sales price display 49, the gallons display 51, and the price per gallon display 53.

The display power supply 65, in this example, provides power to a main front display 67, and a main rear display 69. Some of the elements of the main front display 67 have been described as illustrated in FIG. 1.

The main rear display 69 (not shown) typically consists of an identical display as shown for the control display module 1, for control of a second fuel distribution system located within the same pump housing (not shown), the duplicate system being identical to that shown in FIG. 1. The main displays 67, 69 are used to display the price per unit of volume, total volume dispensed, and total price for the transaction. There is one main display per fueling position. The main display board contains circuitry to sense the temperature of the displays and to turn on the display heaters if they are below a safe operating level. The display boards 66, 67, 69, and 70 receive multiplexed display information from the pump controller 71.

The front and rear boards PPU (Price Per Unit) boards 66, 70 are used to post the price of each grade of product, as received from Pump Controller board 71. There are typically two displays per grade for providing cash/credit options. The PPU displays 66 and 70 receive multiplexed display information from the Pump Controller board 71. This information is routed through the main display boards 67, 69. Note that the Pump Controller Board 71 is a standard item manufactured and sold by Gilbarco Inc., Greensboro, N.C., under part number T15841. The controller board 71 is sold preprogrammed by Gilbarco.

The Pump Controller 71 includes a Z80 microprocessor (in this example) which typically communicates with a remote "operations building"(not shown), stores information for providing control signals to a hydraulic interface subsystem 73, and also may provide the computations for pricing the fuel dispensed by the system. Also the Pump Controller 71 provides control signals for operating the various display elements of the main front display 67 and main rear display 69. It maintains grade price information, volume totals, money totals, and blend ratios in battery backed RAM on the Pump Controller Board 71. The controller board 71 provides multiplexed display information 5 for the main displays 67, 69 and PPU displays 66, 70, communicates with outside consoles via a communications loop (not shown), and transmits and receives data from the hydraulic interface board 73 via a parallel bus 460.

The hydraulic interface subsystem 73 includes the logic and other electronics under control of the Pump Controller 71 for providing valve driver signals for operating a valve driver network 75 to modulate the proportional flow control valves 11 and 13, in this example, for providing the desired flow rates for the associated products to be blended. The hydraulic interface board 73 includes a Z80 microprocessor, and interface circuitry for the pulsers 27, 29, and pump handle 442 (described below) and a communications loop (not shown). Note that in certain instances the system operates to only permit high octane fuel to be delivered to the nozzle 41, or alternately only low octane fuel to be delivered to the nozzle 41, for example, depending upon the operation of the blend selection panel 45.

The valve driver board 75 is supplied power directly from a valve power supply 77, the latter being driven by the AC line. The blend select switches 47 are used to enable the customer to select the desired grade of fuel. The switches 47 are polled by the Pump Controller Board 71 which senses when a switch 47 is depressed. The pump controller board 71 is programmable for providing a range of different blends in association with different ones of the blend select switches 47.

Figure 3:
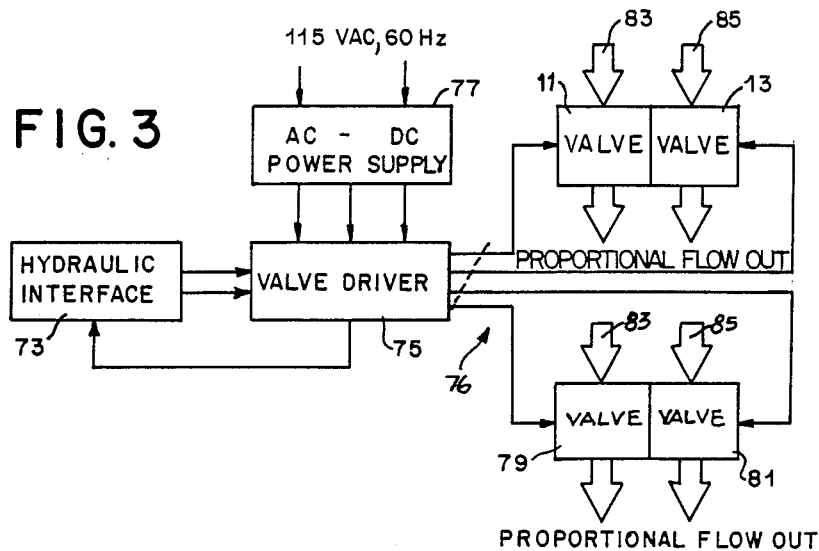
FIG. 3 is a block schematic diagram of an embodiment of the invention.

As shown in FIG. 3, the valve driver printed circuit board 75 is used to provide valve control signals for both operating valves 11, 13 and valves 79, 81 associated with another nozzle on the rear side of the pump housing (not shown), for permitting refueling of a vehicle near the rear of the housing (not shown), while simultaneously fueling a vehicle located at the front of the housing. Also, for this example, assume that low octane fuel 83 is delivered under pressure to the valves 11 and 79, and high octane fuel 85 is delivered under pressure to the valves 13 and 81. In a prototype system, the control signals carried as signal lines 59 and 61 were 100 Hz pulse width modulated (PWM) signals, for example.

Figure 4:
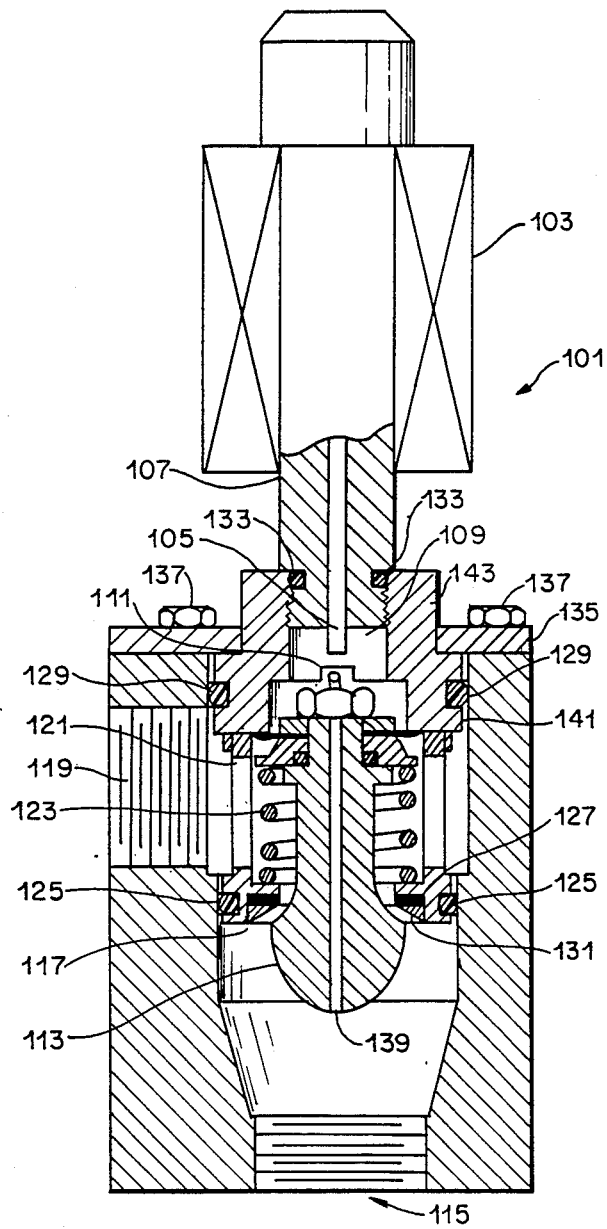
FIG. 4 is a partial cross-sectional view of a proportional flow control valve used in various embodiments of the invention.

In the preferred embodiment of the invention, each one of the valves 11, 13, 79, and 81 are proportional poppet valves as shown in FIG. 4, which is described in detail in the following paragraphs. Another type of proportional valve that may be of use in the present system is a proportional piston valve as described in copending application Ser. No. 064,203, filed June 18, 1987, entitled "Piston Flow Control Valve", and having a common assignee. The control signals applied to these valves are pulse signals, which are pulse width modulated (PWM) in order to control the opening of the associated one of valves 11, 13, 83, and 85 for obtaining a particular flow rate of the associated product.

The proportional poppet valve 101 illustrated in this example of the invention, is shown in FIG. 4. A proportional solenoid 103 is controlled by the PWM (pulse width modulated) control signals for extending solenoid plunger 105, from plunger tube 107 into solenoid cavity 109, to push against poppet seat 111 for moving the profiled poppet 113 downward. Poppet 113 is moved downward to open valve 101 a sufficient amount for obtaining a desired rate of flow of product out of discharge port 115. When valve 101 is opened, fluid flows into the inlet port 119, through valve inlet cavity 121, and valve discharge channel 117 (the size of the channel is directly related to the extent of downward movement or position of the unseated poppet 113), into discharge port 115.

Other components of the illustrative valve 101 will now be described. A fail-shut return spring 123 urges poppet 113 upward to a closed valve or seated position, and will seat the poppet 113 in the event of a power failure, or failure of solenoid 103 (fail-shut operation). A discharge O-ring 125, poppet seal 127, upper O-ring 129, a rolling diaphragm 130, seal retaining ring 131, plunger tube O-ring 133, cartridge retaining flange 135, and flange bolts 137 are located as shown. Also, a pressure balancing orifice 139 is provided axially through poppet 113 to equate the pressure between discharge port 115 and solenoid cavity 109. A "valve cartridge" subassembly 141 includes all of the components between the indicated arrows for 141, as shown. A valve cartridge bracket and support 143 forms part of the cartridge assembly 141, and is retained via flange 135, as shown.

In this example, the product meters 15 and 17 are each Gilbarco Part No. PA010 manufactured by Gilbarco Inc., Greensboro, N.C.. These meters deliver pulse trains that are indicative of the rate of flow of the product through the meters 15, 17. The pulse repetition rates of the pulse trains are directly analogous and directly proportional to the flow rate of the associated products. Each pulse represents a given amount of volume of fluid that has passed through the respective meter 15, 17. The Pump Controller Board 71 is programmed to multiply the number of pulses generated by a given meter over a given dispensing period in order to compute the price of fluid or product dispensed. Note that volume as a function of time provides the average flow rate of product over the same period of time.

Figure 5:
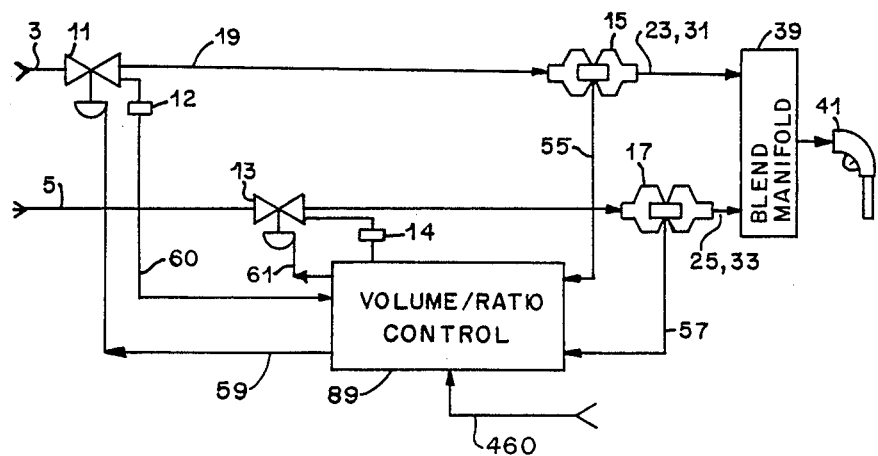
FIG. 5 is a block fluid control diagram showing dynamic system elements for an embodiment of the invention.

In FIG. 5, a fluid control diagram is shown of the illustrative system of FIG. 1. The control module 1 of Figure 1 includes a volume/ratio control system 89 as shown in FIG. 5. The volume/ratio control or subsystem 89 processes a number of system variables, including the blend set point value via data line 460, the latter being provided from the blend selection panel 45, for carrying an electrical signal indicative of which one of the blend selection buttons 47 have been activated. Other system variables processed include the fluid pressures of a first product delivered via line 3, and a second product delivered via line 5. Note that the product pressures are indirectly measured by the accumulated volume pulses over a period of time. Also, the temperature of the valves 11, 13 is indirectly measured by the PWM signal needed to provide for the maximum valve opening by each one of the valves 11, 13 via circuitry 500 and 506, respectively (shown in FIG. 23B, described in detail below) for indicating when the magnitude of the current supplied to one or both of the valves 11, 13 exceeds a predetermined value for each valve. Magnitudes of signal current to the valves 11, 13 above this predetermined magnitude are indicative of an overheating or over-temperature condition therein. The process measurement rate of fluid flow for the first and second products are provided via pulses on signal lines 55, 57, respectively, as previously mentioned. The illustrative system is not product demand oriented, in that the illustrative process provides a blend ratio which tracks the blend set point, while providing a maximized product flow in the preferred embodiment. The volume/ratio control module 89 includes a control algorithm for operating a proportional control process loop, as will be further described below.

Figure 6:
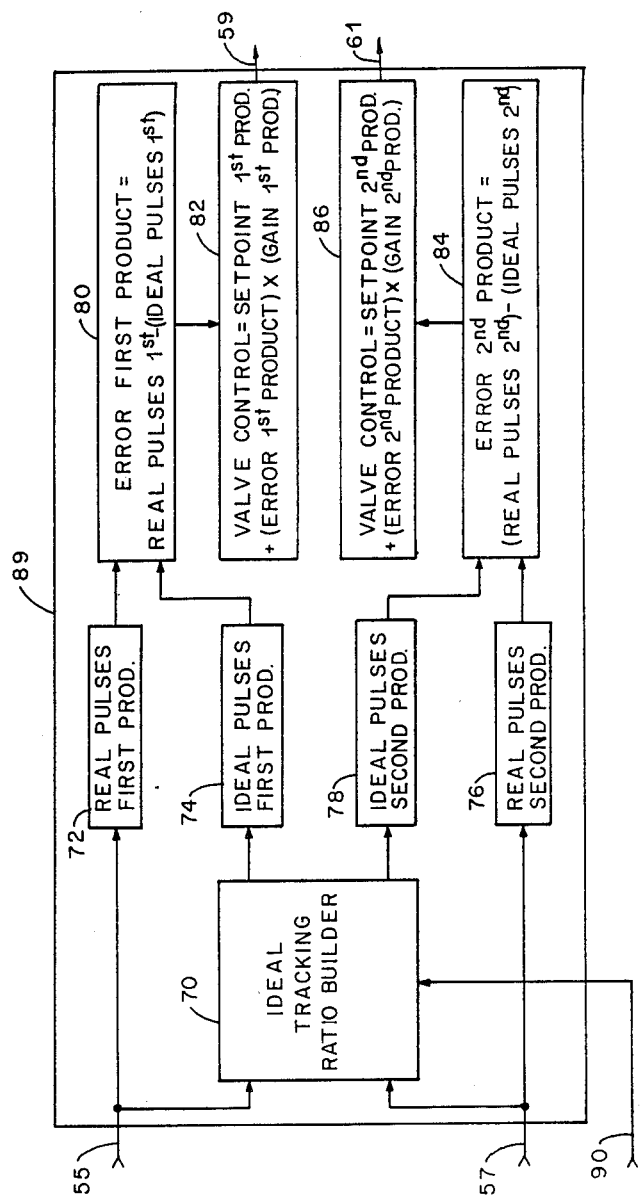
FIG. 6 shows a block schematic diagram of a control model algorithm of an embodiment of the invention.

In FIG. 6, a control model algorithm for the volume/ratio control module 89 is illustrated. As previously indicated, in FIG. 5 all processing measurements and control are conducted prior to the delivery of the first and second products to the blend manifold 39. In this example, signallines 55, 57, and 460 provide the volume pulses for the first product, volume pulses for the second product, and a signal representative of the blend set point, respectively. Output signals for controlling valves 11 and 13 are provided via control lines 59 and 61, respectively. A tracking ratio scheme is utilized in a control algorithm ,described below. The illustrative method of control is based upon relating the, accumulated volume of blended fuel for the first and second products into two related theoretical product volumes, respectively. The theoretical volumes are indicative of the volumes for the first and second products for obtaining perfect blending. As shown, an ideal tracking ratio builder 70 is included for converting the actual volume pulses carried by signal line 55 (the pulses being indicated as "real pulses first product" in block 72) into ideal volume pulses for the first product (see block 74). Similarly, the ideal tracking ratio builder 70 converts the actual volume pulses from signal line 57 (the actual pulses, being indicated as "real pulses second product" via block 76), into ideal volume pulses for the second product as indicated by block 78. The error in the volume flow rate of the first product is calculated by subtracting the actual or real volume pulses from the ideal volume pulses for that product as indicated in block 80. The control signal for controlling valve 11 is estalished by adding a control signal obtained for the blend set point from data line 460 to the result of multiplying the flow rate error of the first product times a gain factor for that product as indicated in block 82. Similarly, the control signal for valve 13 is obtained by first computing the error in the volume flow rate of the second product as shown by block 84. The computed error for the flow rate of the second product is then multiplied by a gain factor for that product and added to set point data previously obtained from the blend set point signal of data line 460 (see block 86). Accordingly, tracking ratio control is provided for obtaining target volume goals for each of the first and second products to be blended, during the real time dispensing of the products to the blend manifold 39. Note that the illustrative tracking ratio method does not provide a calculated value, as would be the case if the accumulated volume of dispensed fuel from nozzle 41 was determined, and then multiplied or divided by the desired blend ratio for establishing the proper proportions of the first and second products. This latter method is deficient in that the blend ratio control is accomplished after the first and second products are actually blended. The present invention, in utilizing a tracking ratio method, provides for adjusting the flow rate of the first and second products on a volume pulse by volume pulse basis for each one of these products.

In this preferred tracking ratio embodiment of the present invention, many advantages are derived, as will be shown below. These advantages include the elimination of multiplication and division algorithms in the ratio calculations. Also, the present tracking ratio method permits the joint control of the valves 11 and 13, either simultaneously (synchronously), or at different times (a synchronously), or partially at the same time, for adjusting the volume flow rate of each one of the first and second products, respectively, where many known prior systems permit volume rate adjustment of only one product at a time. In other words, the closed loop control of valves 11 and 13, respectively, can be in phase, out of phase, or partially in phase. Also, the present tracking ratio method compensates for inherent errors in the system control due to utilization of volume pulses which typically lack high resolution for volume measurements. This is accomplished by defining perfect blends using the minimum resolution of the volume pulses in the system. This prevents the system from correcting errors caused by low system measurement resolution.

As previously indicated, the present tracking ratio method involves building a ratio of that volume of the first product delivered to the volume of the second product delivered (first product volume/second product volume), rather than making a calculation involving the total accumulated volume of the blended product. In the preferred embodiment of the invention, the form of the tracking ratio is equivalent to the calculation from the time of initiation of dispensing of the real time volume of the minor product being dispensed (assume this is the first product) divided by the real time volume of the major product as it is being dispensed (assume the major product is the second product). Accordingly, if at a given point in time in a dispensing cycle 49 volume pulses of the first product have been counted, and 87 volume pulses for the second product have been counted, the tracking ratio 49/87 is meant to show the relationship of the portion of each one of the first and second products in real time to the implied total accumulated volume. In this example, at the time instant measured, the implied total accumulated volume would be the sum total of the volume pulses, which value is 136. Further note that 49/136 is equal to 0.36, the numerical equivalent portion of the first product volume to the total accumulated volume at that instant in time. Accordingly, the tracking ratio, in being expressed as the ratio of the first product to the second product, inherently implies or includes the total accumulated volume. As a result, it is not necessary to perform calculations involving the total accumulated volume, as was recognized by the present inventors.

For example, if the blend set point is 0.36, and at a given time the total accumulated volume pulses are equal to 136 pulses, it follows that for a blend ratio of 0.36 the perfect ratio or ideal ratio at the time of the first product to the second product would be 36.0% of 136 divided by 64.0% of 136, which is directly equivalent to the ratio 49/87, in this example. Accordingly, as has been illustrated, the actual computation using the total accumulated volume is not required in the present method.

The volume pulses entering the volume/ratio control module 89 are statistically assigned to the tracking ratio. The pulses are placed into either the numerator or denominator of the tracking ratio on a pulse-by-pulse basis. In the statistical assignment process, two arrays of numbers are created. In this example, assume that the first array is a minor product array, and the second array a major product array. Each element of the array is either designated as a "0" or a "1" for designating a placeholder for given pulses entering the module 89. The number of placeholders in either the numerator or denominator of the tracking ratio is dependent upon the blend set point, or selected blend. A selected blend has two different assignment arrays associated with it. Each array has a total of 100 elements or placeholders.

Figure 7:
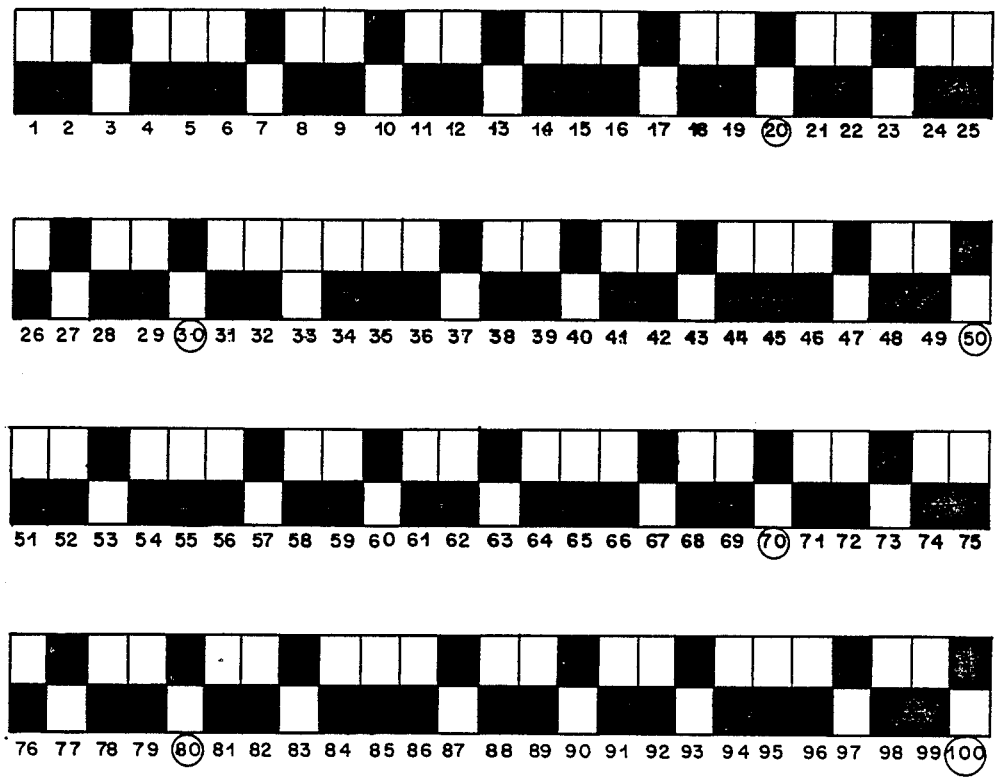
FIG. 7 shows a tracking ratio assignment array for a 36 to 100 blend following the algorithm of one embodiment of the invention.

FIG. 7 shows a tracking ratio assignment array for the previous example of a selected blend 36% or 0.36 for the ratio of the first product to the second product blend. The boxes shown represent placeholders for pulses entering the system. Black boxes indicate places or pulse times where pulses are permitted to be added to the tracking ratio, in accordance with the illustrated algorithm. The numbers along the bottom of the arrays indicate the number of a particular pulse that enters the system during an assignment cycle. An assignment cycle is equal to the array length which is 100. In this example, pulses that enter the volume/ratio control module 89 are assigned by number to the proper location in the ratio as indicated by the black boxes, until such time that the number of pulses are equal to 100, in this example. When this occurs, the assignment of pulses to the ratio is reset, to the beginning of the arrays.

As used in this illustration, the term "placeholders" for the arrays only serve as indicators to indicate whether an incoming pulse should be added to the numerator or denominator of the tracking ratio. However, if the placeholders are analogized to represent pulses, then the two arrays of FIG. 7 are representative of the order in which pulses would appear from the product meters 15 and 17, respectively, during a time of monitoring a perfect blend. Note also that the upper array is representative of the first product (A), and the lower array of the second product (B), in this example. Also, the blackened placeholders indicate the assignment of a pulse to the ratio, whereas the white or blank cells or placeholders indicate that no pulse is to be assigned to the ratio at that time. Also, since the example of FIG. 7 is for a 0.36 blend ratio, each array includes 100 placeholders, with the upper or first product A array indicating the placement of 36 pulses into the ratio for the first product, and the lower array indicating the placement of 64 pulses into the ratio for the second product B.

In FIG. 7, an example of a numerator assignment array for the tracking ratio is shown for a 0.36 blend. In describing this array, reference is also made to FIG. 8. The array of FIG. 7 is based upon the realization that a ratio of 0.36 can be designated as indicated in equation "1" shown below:

$$0.36 = 36/100 = 30/100 + 6/100 = 3/10 + 6/100$$

Figure 8:
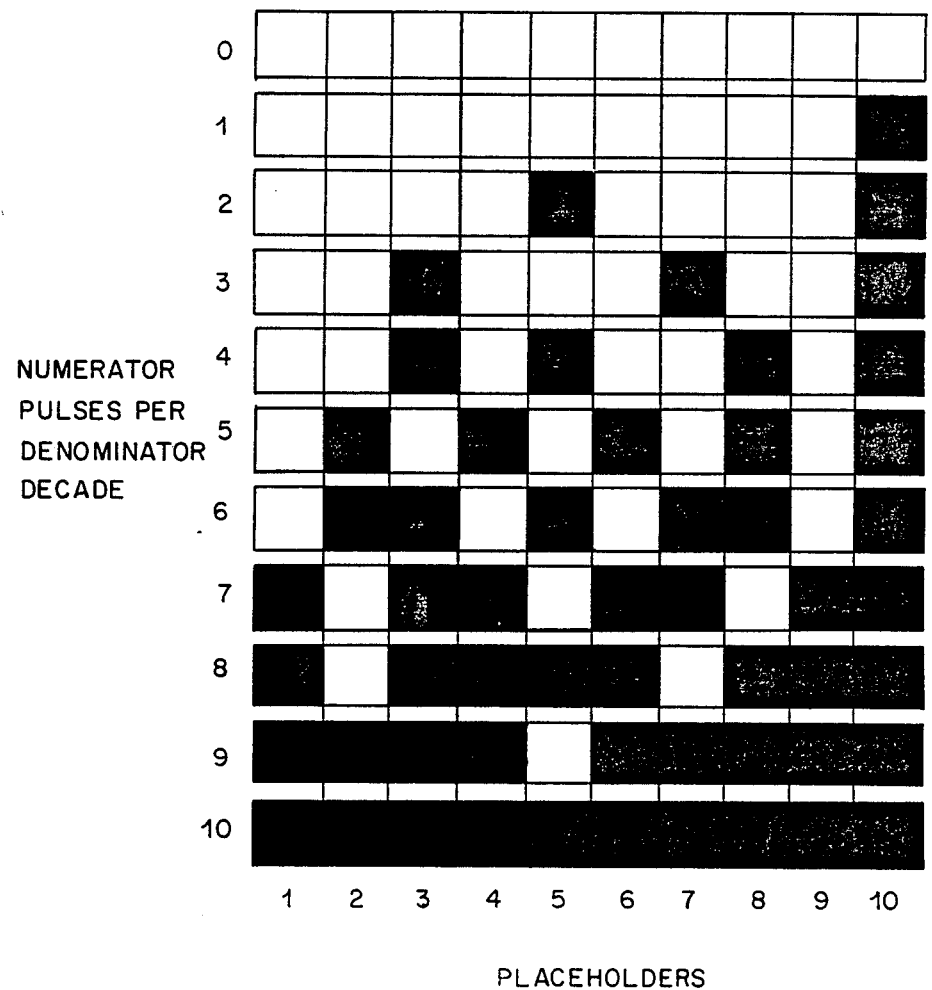
FIG. 8 shows a numerator tracking ratio assignment array for the algorithm of one embodiment of the invention.

Equation [1] illustrates that any selected blend can readily be expressed as a two-digit number over or divided by 100, thereby forming a ratio that includes a tens place number and ones place number. For the example of equation (1) for a 0.36 blend ratio, the tens place number is 3 and the ones place number is 6. Accordingly, the fraction 3/10 indicates that in the ratio for every 3 pulses of the first product, there must be 10 pulses. of the second product. Similarly, the fraction 6/100 indicates that 6 additional pulses of the first product need to be added to the 100 pulses of the total product, in order to maintain the ideal or selected blend ratio of 0.36. In other words, for every 100 pulses of the second product, there are 10 groups of 10 pulses as shown in FIG. 8. For each group of 10 pulses of the total product, 3 volume pulses of the first product must exist to maintain the desired ratio. Since there are 10 groups of 10 pulses for the 100 total product pulses, there must be 30 pulses of the first product for every 100 pulses of the total product, in addition to 6 pulses of the first product out of every 100 pulses for the second product. This results in a total of 36 pulses for the first product for every 64 pulses for the second product, as shown in FIG. 7. This breakdown of the tracking ratio is necessary to accommodate the present algorithm for generating a tracking ratio in terms of cycles of 10, in this example.

From the above discussion, and with further reference to FIG. 7, it is shown that for every 7 pulses of the second product assigned to the denominator of the tracking ratio, 3 pulses of the first product are assigned to the numerator of the tracking ratio.

Upon the first pulse entering the system, the algorithm looks at the "3" cycle placeholder array in FIG. 8 at the first placeholder. Notice that the first placeholder is empty. Because it is empty,. the algorithm places that pulse in the denominator of the tracking ratio. For every pulse that is added to the denominator by the algorithm, the "3" placeholder array is consulted about the disposition of the next pulse entering the system which as a sequential number associated with it. Once ten pulses have been added to the denominator by the algorithm, the "3"cycle starts all over again. Once ten "3" cycles have been completed, the cycle of 100 total pulses is started again.

This process would be complete if the blend ratio were 30/70. However, in this example the blend ratio is 36/64, which requires that for every 100 total product pulses, 6 additional pulses must be added to the numerator of the tracking ratio. It is not logical to add them at the end of the ten "3" placeholder array cycles because they would be spread out to appear in the numerator as the "3" cycles progressed. To solve this problem, the same placeholder arrays in FIG. 8 are used to add the 6 minor product pulses to the numerator of the tracking array. In fact they are added in much the same way that the "3" placeholder array of FIG. 8 was used. For every ten product pulses that have been added to the ratio, the algorithm consults the "6" placeholder array as to the disposition of the next pulse entering the system. If there is a placeholder at that particular cycle, then a pulse is added to the numerator and subtracted from the denominator; otherwise, nothing is altered. After ten "3" placeholder array cycles, all of the "6" placeholders have been consulted and then the cycle 100 pulse cycle starts over again. In FIG. 7, the circled pulse numbers indicate pulses that were added to the numerator and subtracted from the denominator of the tracking ratio after consulting the "6" placeholder array.

The above discussion shows that the placeholder arrays combine to artificially produce a perfect pulse pattern representing the pattern formed if the volume pulses entered the system in a sequence representing a perfect blend. Because the arrays are used to add pulses to either the numerator or denominator of a tracking ratio; at any given volume, the tracking ratio gives the perfect blend volumes of both the minor "A" (first) and major "B" (second) products, respectively. These volumes can be used to examine the real volumes counted via the product meters 15, 17 and to calculate the volume errors for both the first and second products. In practice, the above calculation can be made at any accumulated volume.

In simplistic terms, the algorithm for the volume/ratio control module processes the first and second product pulses, without distinguishing between them. At any given time, the algorithm provides the idealized total number of each of the first and second product volume pulses that would exist for the sum of the first and second product pulses, for providing a perfect blend. In the example of a 0.36 blend ratio, after a sum of 100 volume pulses have been accumulated, the ideal tracking ratio is 36/64 for the A/B ratio. A certain number of the 100 pulses came from meter 15 and the remainder from meter 17. The total number of pulses must be 100 regardless of their source. Also, of the 100 volume pulses, the tracking ratio indicates that 36 of them must have come from meter 15 in order for the volume of fluid dispensed to be a perfect blend.

For example, after 100 pulses, if meter 15 registered 30 pulses and meter 17 registered 70 pulses, the error for the first and second products is derived from the tracking ratio as follows:

$$\text{Error 1st Prod.} = \text{Actual pulses 1st Prod.} - \text{Ideal pulses} \\ \text{1st Prod.} = 30 - 36 = -6 \text{ pulse error.} \quad (2)$$

$$\text{Error 2st Prod.} = \text{Actual pulses 2nd Prod.} - \text{Ideal pulses} \\ \text{2nd Prod.} = 70 - 64 = +6 \text{ pulse error.} \quad (3)$$

Note that the error of one product is always the negative of the error of the other product. For this reason, only the error of one product need be determined, and can be made negative to produce the other product error..

After the volume tracking ratio errors have been calculated, the valves 15 and 17 must be adjusted to compensate for the errors. The tracking ratio provides a method by which each valve 15, 17 can be simultaneously controlled. Because the error is not calculated as a function of time, the control exhibited by the tracking ratio will be proportional control, which is a control function that is the product of a gain and an error. In this application, set points are also used to offset the valve positions.

Directly translated, the control functions for both valves are as follows, where "A" designates the first product, and "B" designates the second product (see FIG. 6):

$$\text{Valve 15 Position For A} = \text{Blend Setpoint A} + (\text{Error A} \times \text{Gain A}) \quad (4)$$

$$\text{Valve 17 Position For B} = \text{Blend Setpoint B} + (\text{Error B} \times \text{Gain B}) \quad (5)$$

In the software flowcharts of FIGS. 9–18, the set points for both valves 15, 17 can be altered. The gains for each product can also be altered, and are blend dependent. These changes are made via software modifications.

With further reference to the tracking ratio assignment array of FIG. 7, as previously described the upper row for each array group represents the first product placeholders, and the lower row the second product placeholders. These arrays designate how the associated pulses received from the product meters 15 and 17 for the first and second products, respectively, must be assigned to either the numerator or denominator of the idealized tracking ratio for maintaining an ideal blend over 136 counts. For example, assume that at the time of occurrence of placeholder "5", shown in the uppermost array, a pulse for the first product is received. Since the placeholder for the first product at the placeholder position 5 is blank, no pulse should occur at this pulse time for the first product in the ideal situation, and therefore represents an error of +1 pulse. Accordingly, the present system is programmed to respond by slowing down the volume rate for the first product and/or speeding up the volume rate for the second product in order to obtain correspondence between the placeholder positions and the occurrence of the volume pulses for the first and second products for correspondence to the idealized blend ratio for the preselected blend.

With further reference to the tracking ratio numerator assignment arrays of FIG. 8, these arrays provides for the statistical generation of idealized tracking ratio blends from 1 to 99 or 99 to 1 for the ratio of the first product to the second product. For every 10 volume pulses received by the ideal tracking ratio builder 70 (see FIG. 6), for the example of a 0.36 blend ratio, row 6 of the array of FIG. 8 is entered for determining the placement of the volume pulses representing the 100ths portion of the blend ratio, in this example 0.X6. Also, for every volume pulse received by ratio builder 70, the tens placeholders are obtain. For the example of a 0.36 ratio, the tens place row 3 is observed to see if a pulse should be added to the numerator for the particular placeholder at a given time. In other words, for a 0.36 blend ratio, for example, row 3 is used for the tens place, and row 6 for the 100ths place. Accordingly, if during the time of occurrence of placeholder 3 a volume pulse is received, regardless of which one of the meters 15 or 17 that it is received from, a pulse is added to the numerator of the tracking ratio since the array for row 3 shows a filled-in cell for the position of placeholder 3. Similarly, at every 10th count of a received volume pulse, regardless of origin, for the 0.36 blend ratio, row 6 is observed at the time of occurrence of the third place holder, which shows a filled-in cell for indicating that at this time a pulse should be added to the numerator and subtracted from the denominator to obtain the idealized tracking ratio. In a similar manner, other rows are observed for other idealized tracking ratios.

The software for operating the present system will now be described with reference to FIGS. 9 through 18 showing the flowcharts for the software. Following this description will be a description of the hardware associated with the system.

Figure 9:
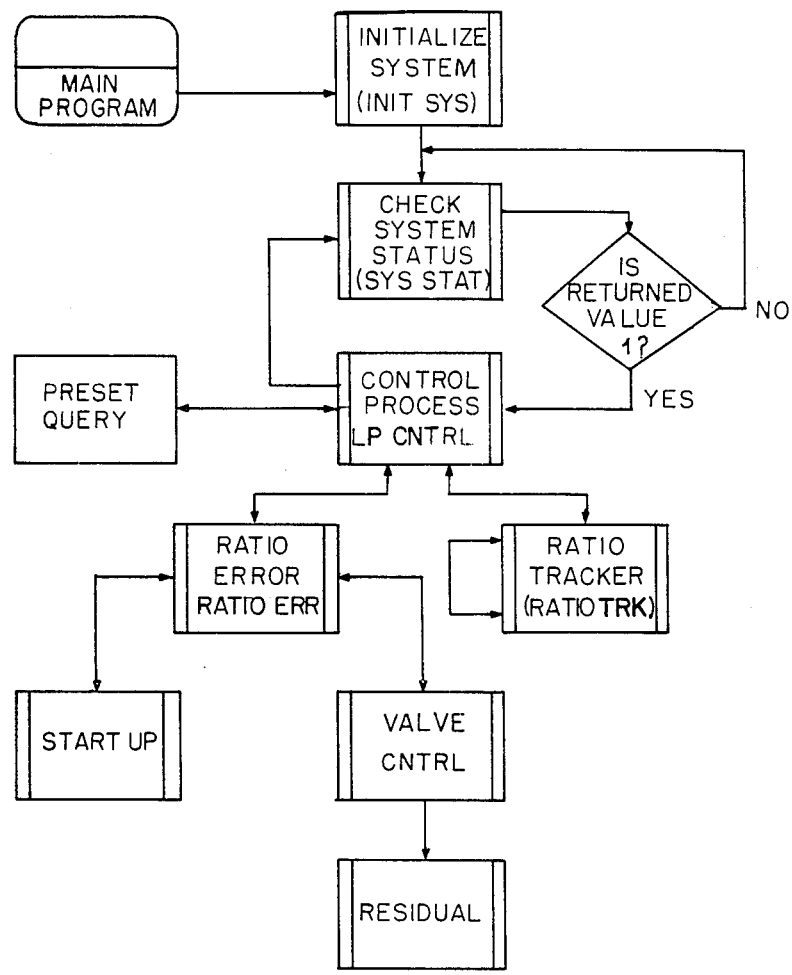
FIG. 9 is a flowchart for the main program for the hydraulics interface of one embodiment of the invention showing the connection of program modules thereof.
Figure 10:
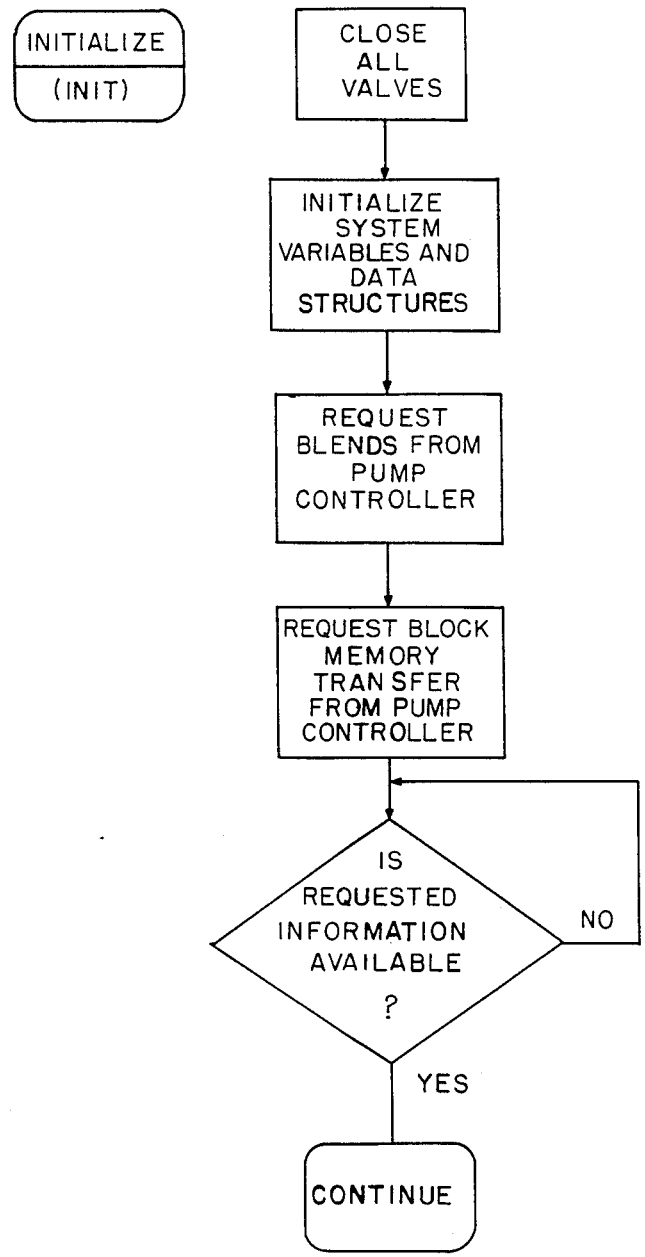
FIG. 10 is a flowchart of the program module "INIT SYS" of FIG. 9.
Figure 11:
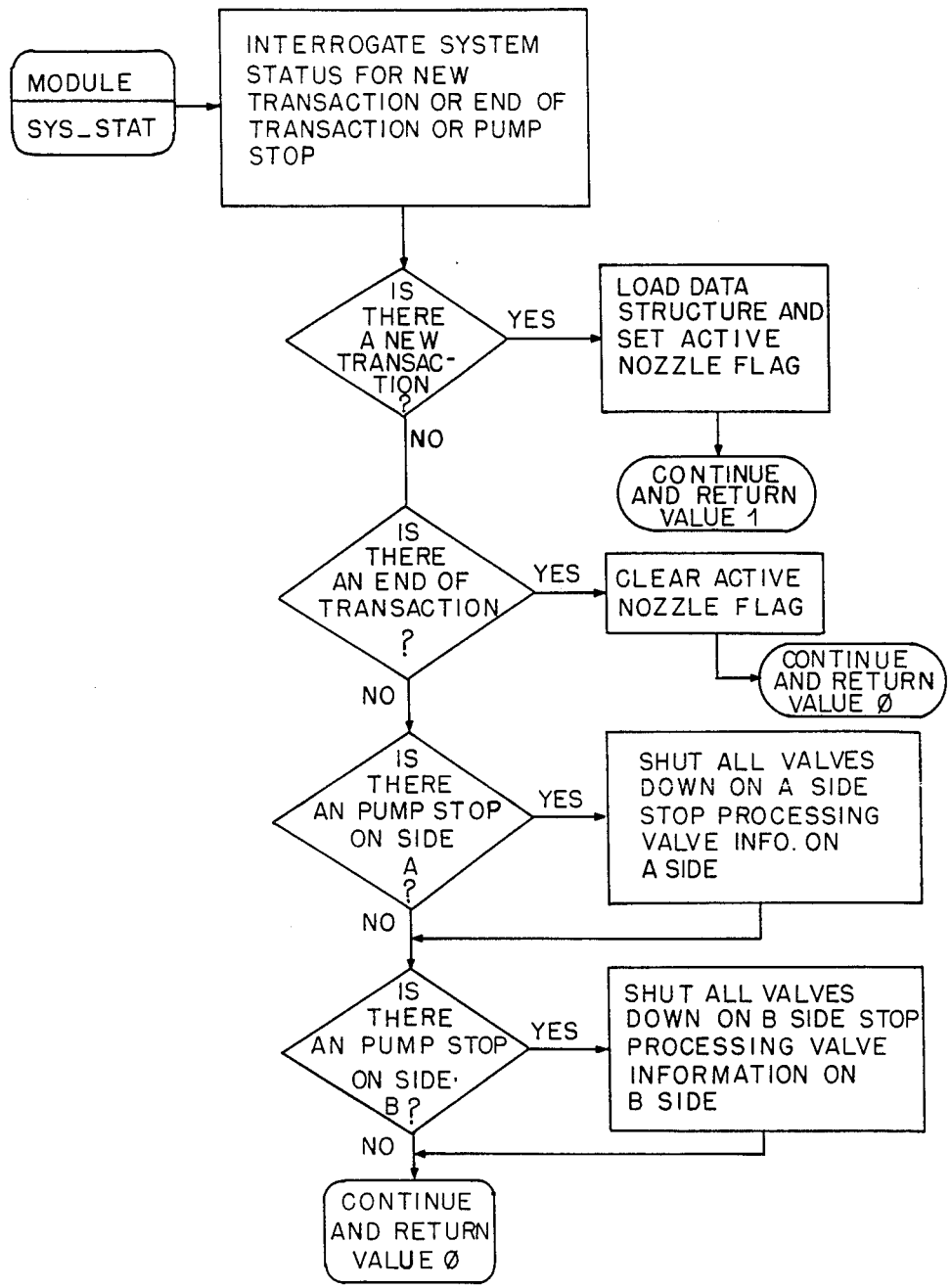
FIG. 11 is a flowchart of the program module "SYS STAT" of FIG. 9.

The main program is shown in FIG. 9. As indicated, the first step in beginning a dispensing cycle is to initialize the system. The status of all memories (to be described later) are checked, data structures and valve overrun arrays are initialized (to be described later), and all valves (11, 13 in this example) are closed. Greater detail for the initialization programming is shown in the flowchart of FIG. 10. The second step in the main program is to check the system status to determine any changes in state affecting operation of the pump controller 71. The flowchart of FIG. 11 shows the system status program in detail.

The third step in the main program is the control process or loop control step. The loop control step program is shown in detail in the flowchart of FIG. 12 for controlling the obtainment of a selected blend. Two internal sub-routines are utilized, RATIO TRK and RATIO ERR, respectively. In parallel with the control process program is a "Preset Query" program, for which the programming steps are shown in detail in FIG. 13.

Figure 14:
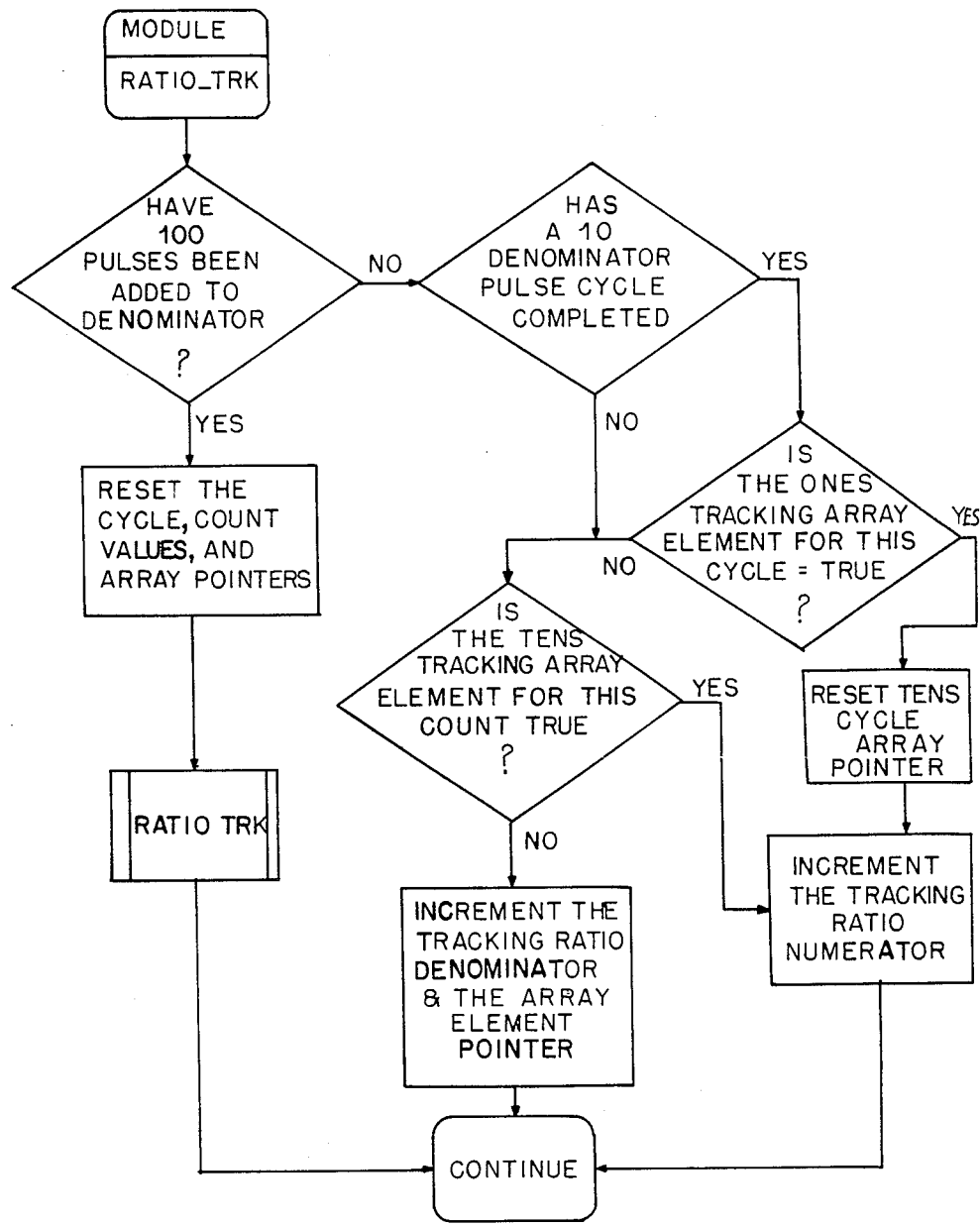
FIG. 14 is a flowchart of the program module "RATIO TRK" of FIG. 9.
Figure 15:
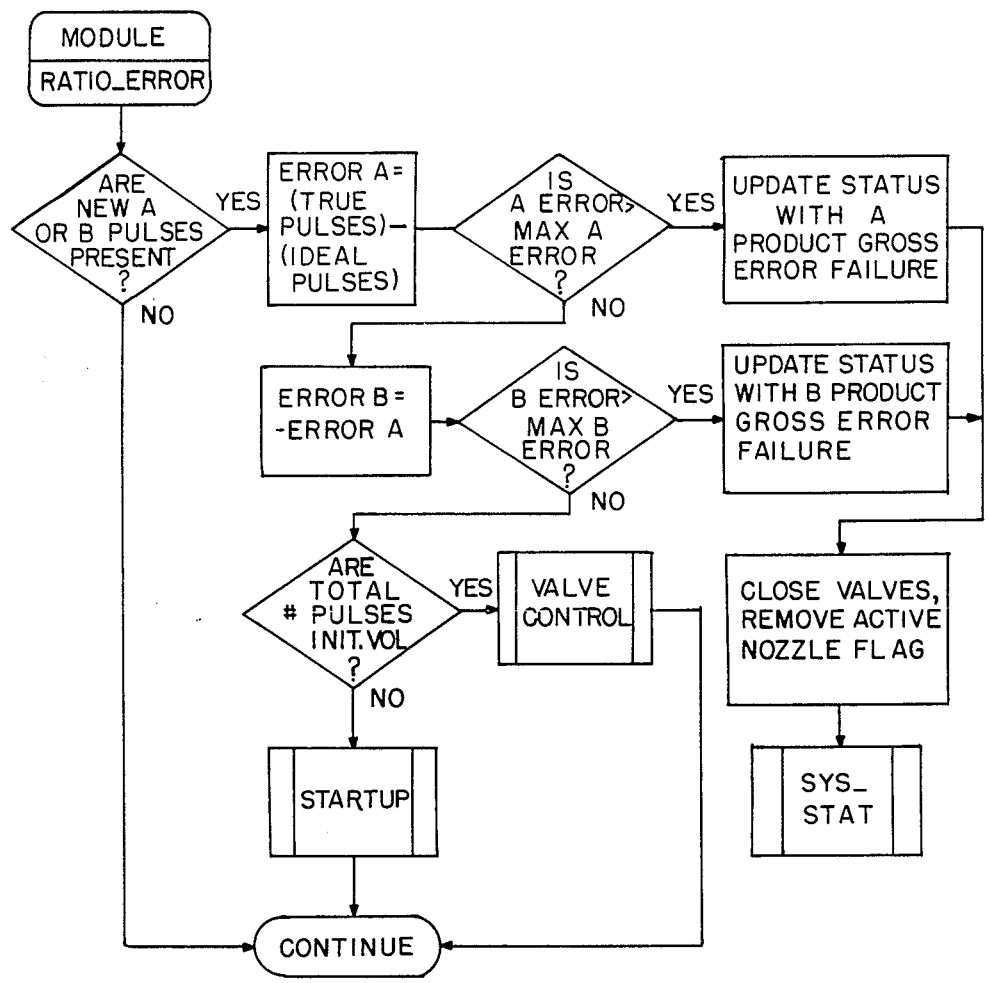
FIG. 15 is a flowchart of the program module "RATIO ERR" of FIG. 9.

The fourth level of the main program includes the sub-routines for the Ratio Tracker program (shown in detail in the flowchart of FIG. 14), and the Ratio Error program (shown in detail in the flowchart of FIG. 15). The Ratio Tracker program builds the ideal ratio, as previously described, based on the total number of pulses received from the first and second product meters 15, 17. This routine is re-entrant one level. Also, the Ratio Error is programmed to process the ideal ratio by comparing it with the actual ratio of the actual volume pulses for the first and second products, in this example. This latter sub-routine includes in itself two sub-routines designated as "STARTUP", and "VALVE CNRTL", as shown.

The STARTUP sub-routine provides for the initial ramping of the volume flow rate for the first and second products, and monitors the driving of the valves 11, 13, in this example. This routine is active for only a predetermined number of volume pulses. After the predetermined number of volume pulses is counted, the routine is terminated, and the VALVE CNTRL program then dominates. The programming for the STARTUP routine is shown in detail in the flowchart of FIG. 16.

Figure 17:
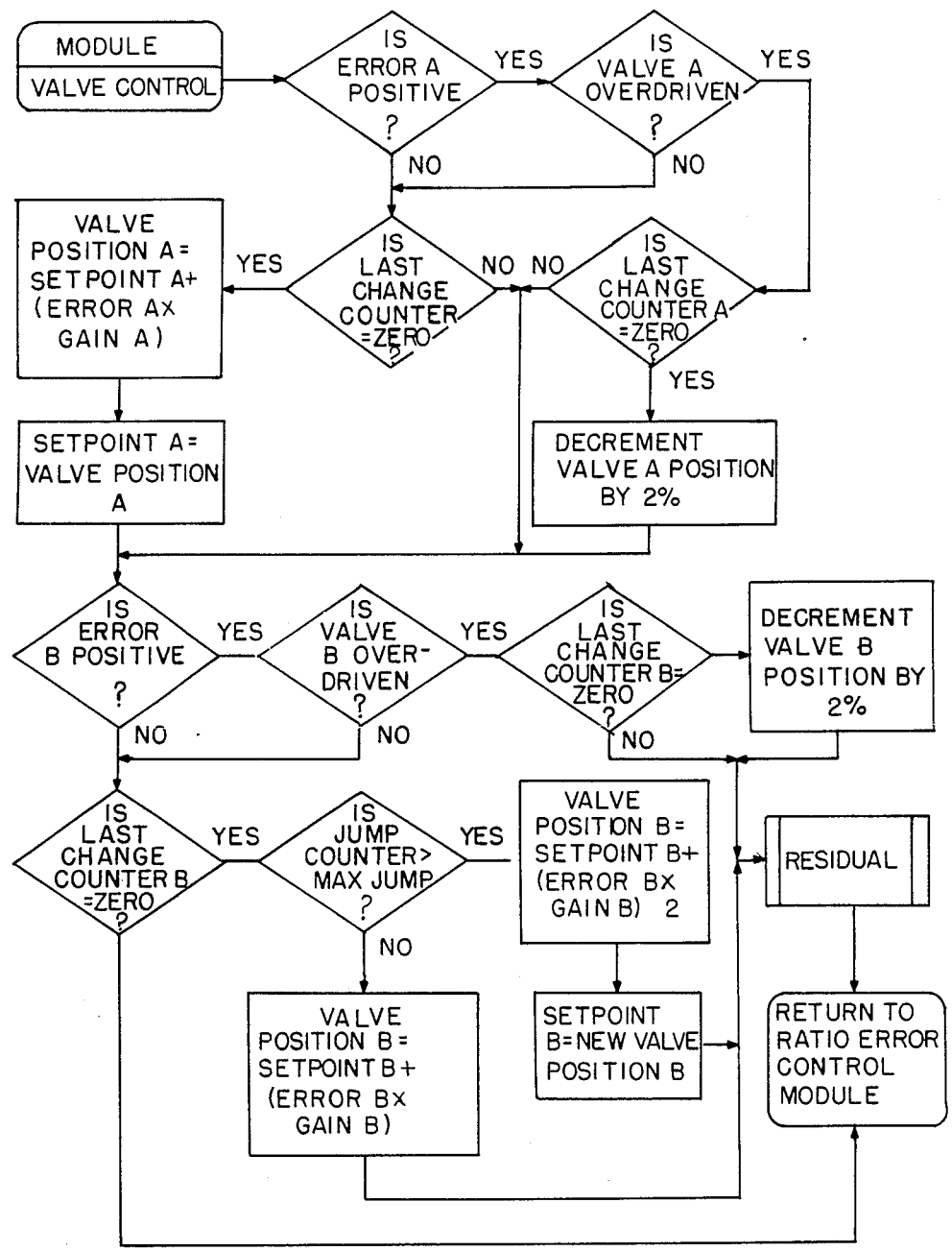
FIG. 17 is a flowchart of the program module "VALVE CNTRL" of FIG. 9.

The valve control (VALVE CNTRL) program routine controls valves 11, 13, in this example, to prevent overdriving these valves past their physical control range. An important subroutine of the valve control program is designated as "RESIDUAL". Details for the programming of the valve control are shown in the flowchart of FIG. 17.

Figure 18:
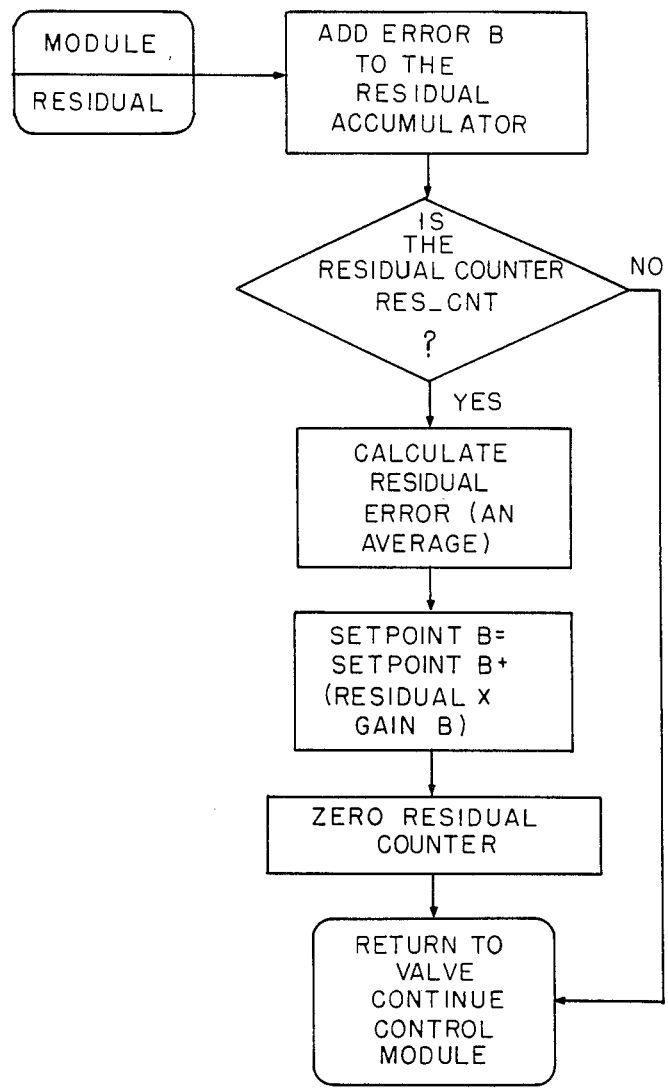
FIG. 18 is a flowchart of the program module "RESIDUAL" of FIG. 9.

The last program step of the main program is the "RESIDUAL". The RESIDUAL program routine measures the stagnant error in the system, and then corrects the blend set point in order to substantially eliminate the error. The error adjustment is made on a periodic basis. Details for the program for the RESIDUAL routine are shown in the flowchart of FIG. 18.

With reference to FIG. 10, the first step for the programming of the "Initialize System" routine is to close the valves 11, 13 in this example. First priority is given to this step, and supersedes all microprocessor interrupts by disabling the same. After the valves 11, 13 are closed, the microprocessor interrupts are enabled. The interrupts are initiated to read data from the pulsers 27, 29, in this example, and to interrupt valve control when the pump controller 71 is communicating with the hydraulic interface 73.

The second step of the initialization program is to initialize the system variables and data structures. The initialization step moves static variables from ROM to RAM (to be described below), and also zeros any variables and memory pointers, as required. The next step is to initiate an interrupt communications routine to obtain the selected blend from the pump controller board 71.

With reference to FIG. 11, the first step in the system status program is to interrogate the system status once every predetermined monitoring cycle in order to determine various states in the control process. The second step is to determine whether a new transaction is in progress. If a new transaction is in progress, the selected blend information associated with an activated nozzle 41 is loaded into the active nozzle data structure from the Pump Controller Board 71, that is into RAM located on the hydraulic interface board 73 for presetting the blend and volume. If a new transaction is not in progress, the loading routine is skipped, and the third step for determining whether there is an end of transaction is initiated. If the answer is yes, action is taken to terminate any indication of an active process in the system. The fifth step is to determine whether a "pump stop" signal has been initiated. Note that the fourth and fifth steps indicate "side A", and "side B", respectively. In this example, the term "side A" is related to one pumping station of a multi-product dispensing system, whereas "side B" relates to the other or a second product dispensing station of the multiple product dispenser. As shown for steps 4 and 5, if a pump stop signal is provided for either side "A" or side "B", the valves 11, 13, in this example, associated with and duplicated on each side of the multiple product dispenser are closed, and associated processing is terminated. The flow of the blended product associated with the pumping station for which a pump stop signal has been initiated will be terminated. Pump stop signals are only removed in the present system by the subsequent initiation of an end of transaction signal, or a "RE-ENABLE TRANSACTION" command signal. These signals are transmitted from the Pump Controller Board 71.

Figure 12:
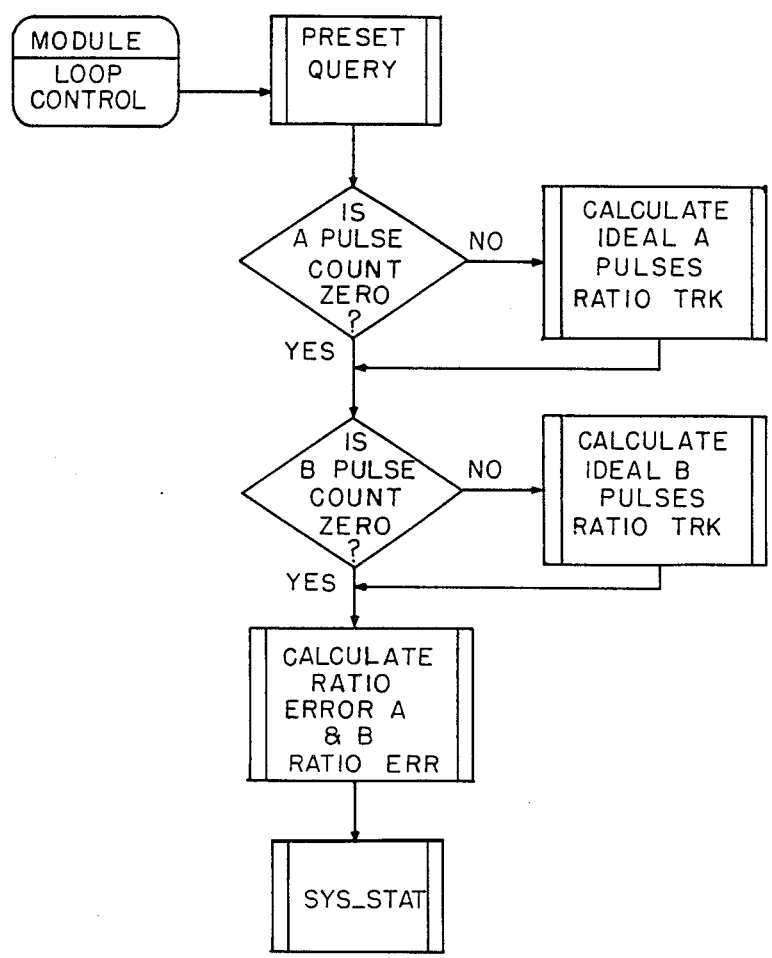
FIG. 12 is a flowchart of the program module "LOOP CONTROL" designated in FIG. 9 as "LP CNTRL"

The loop control program, as shown in FIG. 12, includes a "PRESET QUERY" routine (see FIG. 13) as a first step for providing a preset slow-down of the volume flow rate, a preset shut-down of product dispensement, and the measurement of any flow overruns during the shutdown process. For example, if a volume of 5 gallons has been selected via a selection control (not shown) on the control panel 1, as the system approaches the dispensement of 5 gallons of product, the rate of flow of the product is slowed down in order to permit closure of the associated one or both of valves 11, 13, when the selected volume is attained. Note that in this flowchart, and in the flowcharts for FIGS. 13 through 18, the designation "A" relates to the first product, and the designation "B" relates to the second product.

In the second step for the loop control, an inquiry is made as to whether any volume pulses have been accumulated for the first product, product "A". If blended fluid is being dispensed from nozzle 41, then volume pulses will be accumulated 5 for both the first and second products, products A and B, respectively, in this example. As shown in the second and third steps, if pulses are being accumulated for products A and B, the ideal ratios for these products is calculated for determining the ideal tracking ratio, as described in FIG. 14. The fourth step is to calculate the error between the ideal blend ratio and the actual blend ratio formed by the products, as previously described. The programming for the error calculation is shown in detail in the flowchart of FIG. 15. After the errors are calculated, the last step is to return to the system status programming routine shown in FIG. 11.

Figure 13:
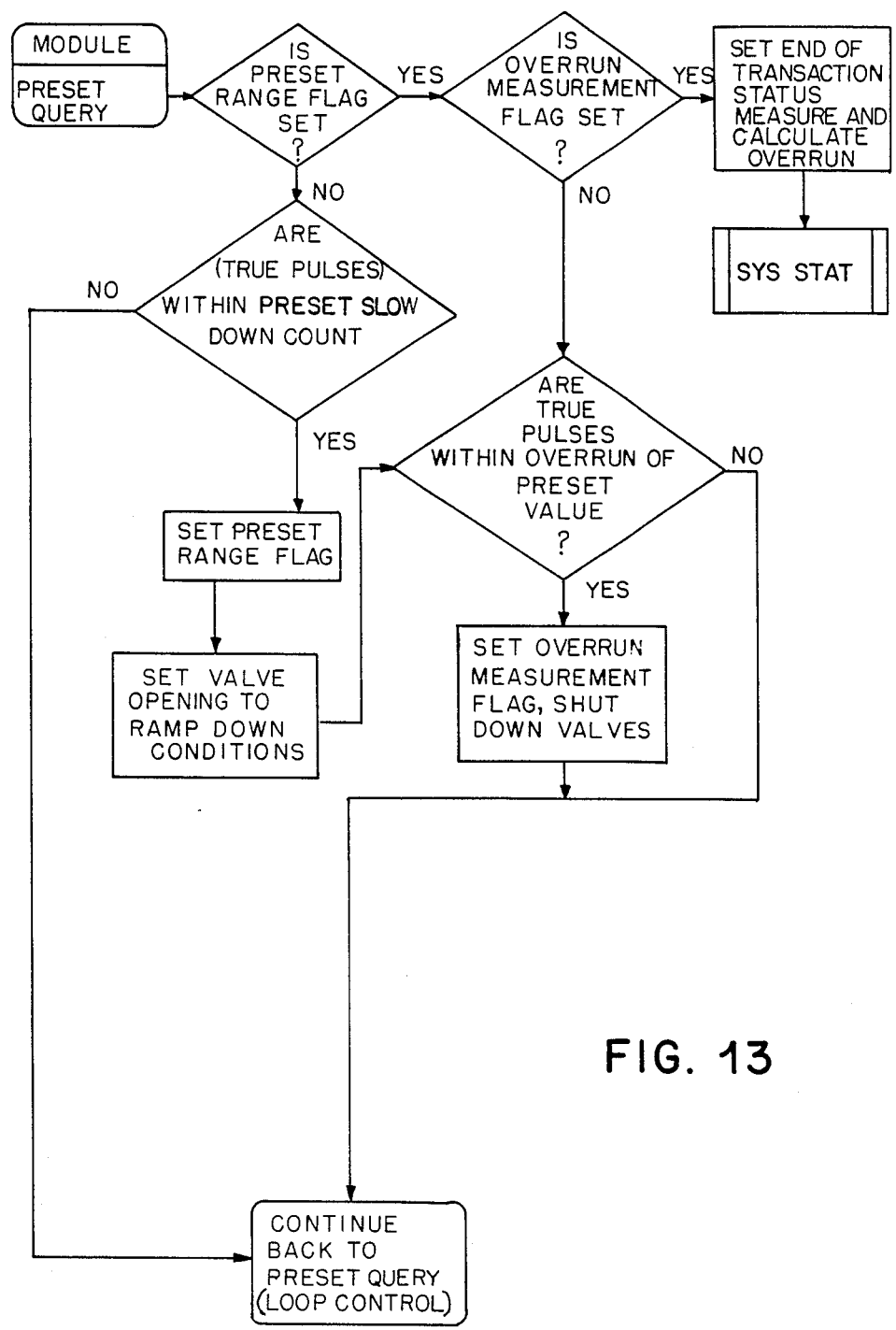
FIG. 13 is a flowchart of the program module "PRESET QUERY" of FIG. 9.

The flowchart for the Preset Query programming is shown in FIG. 13. As previously mentioned, this program routine is provided to monitor the accumulated volume of the blended product to determine when that volume enters a preset volume range. Monitoring continues into the preset range, and when the preset volume is delivered the valves 11, 13 are closed, and the valve "OVERRUN" is measured on the next cycle and recorded. Note that in this flowchart "EOT" designates end of transaction, and "Valve B" designates the valve for the control of the flow of the second product (Product B), which valve is valve 13 in this example. The objective of the PRESET QUERY program is to close down the valves 11, 13, in this example, in a step-like fashion near the end of the delivery of the preset volume of blended product, in order to avoid an overrun condition. The flow ramping and overdrive adjustment will be described below in greater detail. However, for the purposes of this present flowchart, note that upon entering the preset range, the B valve (valve 13 in this example) is controlled to step down to a minimum volume flow rate for the second product. At the end of the PRESET QUERY program routine, the programming returns to the Loop Control program shown in FIG. 12.

The program module for the Ratio Error program is shown in FIG. 15. Note that in the first two levels of this program, the maximum gross error is blend-dependent, and is applicable to either a blended product of the first and second products (products A and B, respectively), or to the delivery or dispensing of only the first product or the second product. Also, in the third level of program, the "VALUE CNTRL" sub-program controls the valve overposition or overdrive conditions. Also, the last step in the program "STARTUP" provides for the control of the initial ramping of the volume flow rate for the first and second products, and monitors the overdrive conditions of the valves 11, 13. This program is shown in detail in the flowchart of FIG. 16.

The program for the Ratio Tracker is shown in Figure 14. As previously mentioned, the ratio tracker program provides for accumulation of the total number of volume pulses accumulated at any given time, and assigns each one of the incoming pulses to either the numerator or denominator of an idealized tracking ratio. The idealized ratio represents the distribution of the total number of volume pulses associated with the first and second products (products A and B) under conditions of perfect blending. The Ratio Tracker program is written to follow the statistical arrays of FIG. 8. Note that at the third level of the program, one step calls for itself, that is for "RATIO TRK", for purposes of re-entrancing. Also note that the tracking algorithm cycles upon receiving one hundred volume pulses of the major product being blended. The algorithm adds the incoming pulses to either the numerator (the minor product being blended) or the denominator (the larger product being blended) in accordance with the statistical arrays of FIG. 8, in order to form the tracking ratio, as previously described. Note that there is a placeholder assignment for every incoming pulse of the hundred pulses associated with a given cycle. The placeholder array is statistically predetermined for use with each blend of a family of blends, that for practical purposes covers every possible blend that might be preselected.

Figure 16:
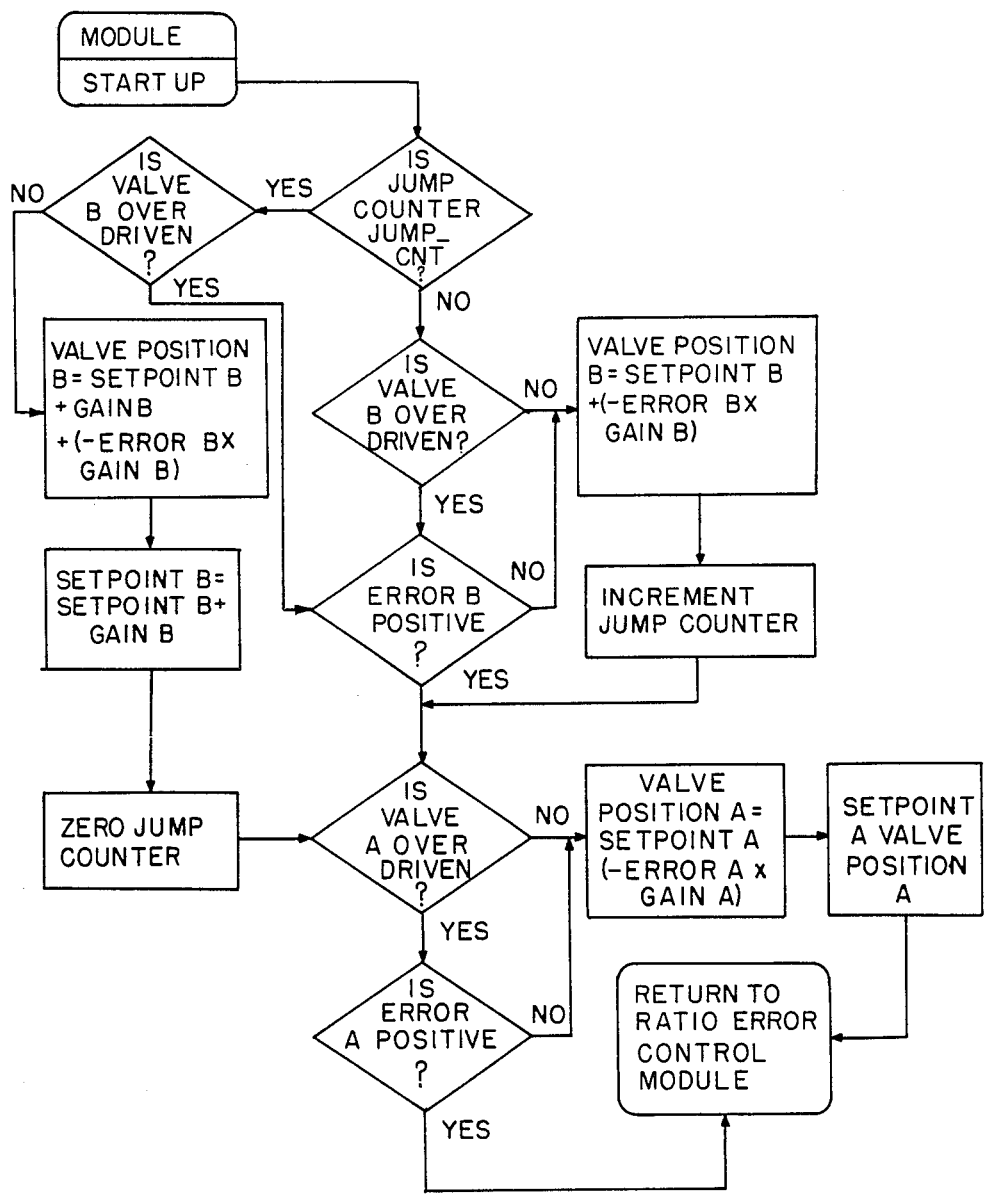
FIG. 16 is a flowchart of the program module "STARTUP" of FIG. 9.

In FIG. 16, the program module for "STARTUP" is shown. This module is triggered by the initialized volume, that is by the pump controller board 71 signalling that a transaction has begun. STARTUP is the process initialization routine for the system control loop. This control loop is always in control of the blending process, but it should be noted that the major product is ramped up in volume flow rate from the initial start of the transaction. In effect, the STARTUP programming is used to initiate the flow of the first and second products by setting their associated valves 11 13 at predetermined values associated with the preselected blend value. The flow rate for the major product is ramped up to some higher flow rate than the initial preset value in order to achieve a controlled maximized rate of flow for the first and second products.

The "JUMP CNT" step is performed for every received volume pulse, and for every 100 pulses counted, the flow rate of the major product is incrementally ramped up in value within a range. Also at this time, as shown at the second level of the program, the loop beginning with the step of determining whether valve "B" (valve 13 in this example) is checked for an overdrive condition. If valve B is not overdriven, then the three successive steps shown in the lower left of the program module are followed. If valve B (13) is being overdriven, it is in a wide open condition, and the programming step for determining whether the error in the valve drive is positive is initiated. If the error is positive, the program acts to close the valve 13 to the extent indicated by the determined error. As shown, if valve B (13) is not overdriven or the error in drive is not positive, the upper to righthand most steps are followed in the routine. Basically, the routine operates by opening the major product valve, valve 13 in this example, by an increment of the gain associated with the valve 13. The number of incremental changes required in adjusting the valve is directly related to the degree of error in the tracking ratio. The "Increment Jump Counter" step provides the incremental changes in driving the valve 13. The counter associated with this step is located in a memory location RAM on the hydraulic interface board 73, to be described below. If the valve under adjustment, valve 13 in this example, is incrementally opened to the point where it is being overdriven, the program operates to insure that the valve 13 is no longer adjusted by negative errors or periodically incrementally opened to a greater extent. Also note that the microprocessor (to be described below) located in the control module 1 is operated by the present program for incrementing the RAM on the hydraulic board 73. The steps at the lowest two levels of this program provide for control of the minor product valve, associated with product A, valve 11 in this example. After the adjustment of the minor product valve 11, program control is returned to the ratio error control program module shown in FIG. 14.

The flowchart for the program module "VALVE CNTRL", valve control, is shown in FIG. 17. As previously mentioned, upon signalling from the ratio error program control module shown in FIG. 15, the valve control program routine is initiated. The valve control program monitors the application of error values into the control signals applied to the valves. If one of the valves 11, 13, in this example, is being overdriven, and the error determined by the ratio error module program of FIG. 15 is indicative of too low a flow rate for the associated product, the control signal for driving the valve is not changed. Contrary wise, when the error is determined to be causing too high a flow rate for the associated product, the control signal applied to the valve is incrementally reduced to reduce the flow rate of the associated product. The module valve control routine also maximizes the flow rate of the major product via incrementing of the associated set point by 5.0% for ever 100 received volume pulses, provided that the valve associated with the major product, valve 13 in this example, is not being overdriven at the time. The counters indicated in the module valve control program are located on the hydraulic interface board 73 within RAM memories, to be described below. The program step entitled "RESIDUAL" is a program routine (see FIG. 18 flowchart) for providing measurement of the stagnant error in the system, in order to adjust the set point for substantially eliminating the stagnant error.

The program module entitled "RESIDUAL" is shown in flowchart form in FIG. 18. The residual error results from an accumulation of error due to the set point of the major product being set away from the point at which the tracking ratio operates optimally. For this reason, and also with reference to equation (5), the tracking ratio inherently adds an error to the misplaced set point in order bring the blend ratio back into ideal balance. Since the tracking ratio indicates movement away from the optimum operating point for the ratio, the blend ratio eventually moves away from its optimal value, that is, is offset from the ideal ratio. Note that the "residual counter" and "residual acccumulator" shown in the various steps of this program, are located in RAM (not shown) on the hydraulic interface board 73.

Figure 19:
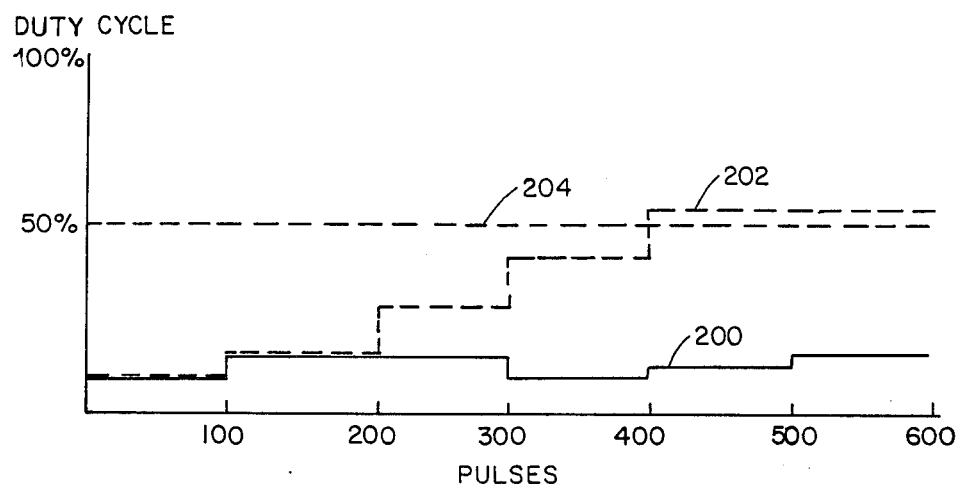
FIGS. 19 and 20 show curves illustrative of the initial ramping up and typical mid-cycle corrections, respectively, for controlling the duty cycle of the valves for a 1 to 9 blend.

In FIG. 19, an example for the initial flow rate ramping control of the valves 11, 13, in this example, is shown for a blend ratio of 10:90 of the first product (product A; the minor product) to the second product (product B, the major product), respectively. The ramping control curves shown in FIG. 19 are a product of the programming control obtained from the program module "STARTUP" shown in FIG. 16, and previously described. The drive control ramping function for valve 11 is shown by curve 200, and for the major product control valve 13 via curve 202. The overdrive level for valves 11, 13 is shown by the horizontal dashed line 204. The curves 200 and 202 are illustrative for a blend ratio of 10 parts of the minor product to 90 parts of the major product, in other words a 10 to 90 or 1 to 9 blend ratio. As illustrated in this example, at the initiation of a product or blended product dispensing cycle, the valves 11 and 13 are opened an equal amount for the first 100 volume pulses received. After the 100th volume pulse is received, the valves are opened equally an increasing amount as shown by the step function in the curves 200, 202. The valves remain at the same opening for another 100 pulses, until at the 200th volume pulse valve 13 is ramped up to a substantially more open setting, whereas valve 11 is controlled by the tracking ratio, each for the next 100 pulses until the receipt of the 300th volume pulse, at which time the valve 13 is ramped up to a substantially more open setting, and valve 11 is reduced in its opening setting by the tracking ratio control. At the receipt of the 400th volume pulse, valve 13 is opened further for an increased volume flow of the major product, whereas valve 11 is slightly increased in its opening setting for a slightly increased rate of flow. After the 500th pulse is received, valve 13 is maintained at its flow rate setting, whereas valve 11 is again opened slightly more for obtaining a slightly increased flow for the minor product. Obviously, the characteristics of the ramping curves 200 and 202 will vary in accordance with the blend ratio, the type of valves used, the temperature of the product controlled by each of the valves 11, 13, and other factors. After the receipt of 500 volume pulses, control of the valves 11 and 13 is under the process control program shown in the program module of FIG. 12.

Figure 20:
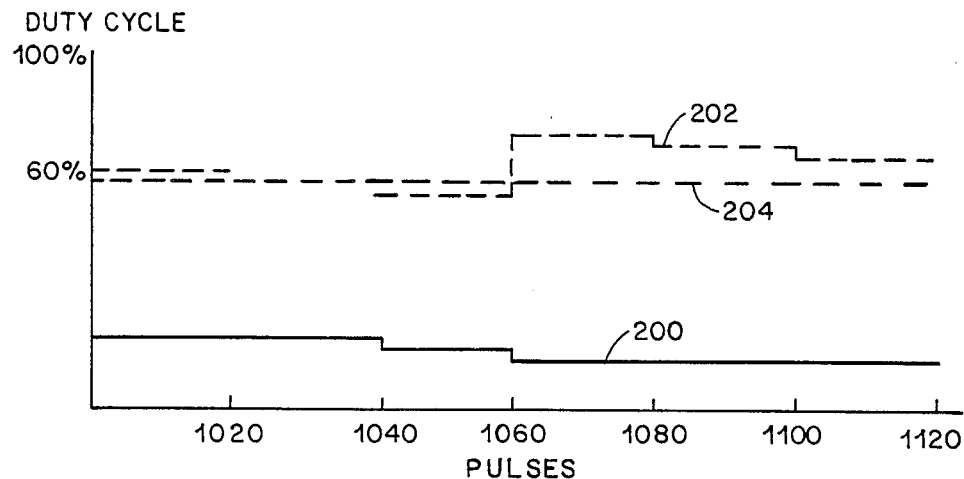

In FIG. 20, an example of control of the duty cycle of the valves 11, 13 during a portion of a dispensing operation for a blend ratio of 10:90 is shown. As previously mentioned, such control is obtained from the program module "VALVE CNTRL" shown in the flowchart of FIG. 17. Note that for FIGS. 19 and 20, and for the example of the present invention as described herein, each volume pulse represents 0.231 cubic inches of fluid, such as gasoline, for example.

A more detailed description of the electrical circuitry for the subject invention will now be made, initially with reference to FIG. 2. The main power supply 62 is provided by a typical switching power supply for supplying +14.5 VDC and +5.0 VDC to the system. $+V_S$ is provided by resistively (not shown) dividing down +14.5 VDC to 12.0 VDC. The output voltage from the display regulator board 65 is applied to the PPU front display 66, main front display 67, main rear display 69, and PPU rear display 70. Also, a voltage output from the main regulator is applied to the pump controller for application to the hydraulic interface board 73, and therefrom to the valve driver board 75, for energizing the valves 11 and 13 with a pulsewidth modulated signal, varied in pulsewidth to control the duty cycle of the valves 11, 13, in accordance with the control provided by pump controller 71.

FIGS. 21A through 21I, and FIG. 22 show the hydraulic interface board 73 details. With reference to these FIGS., beginning with FIG. 21A, a COP or Computer Operating Properly circuit 302 receives a signal along line 300 from a 3 to 8 decoder 304 (see FIG. 21D) approximately every 47 milliseconds for maintaining the charge on capacitor 306, for in turn maintaining the level of the output signal from the COP circuit 302 at output line 308 at a high level indicative of the proper system operation. If for some reason the system program "crashes", or some other malfunction occurs which interrupts the periodic charging of capacitor 306, the capacitor will discharge through resistor 310, causing the output of inverter 312 to go high, which high signal is coupled via resistor 314 to inverter 316, whereby the output level of inverter 316 goes low, for indicating the system crash. The change in state of the signal along signal line 308 from a low to a high signal causes the microprocessor 318 to go into a programmed routine for restoring proper operation of the system. The microprocessor 318 is shown on FIG. 21B; and is a Z80 standard microprocessor integrated circuit chip.

Other components of the COP circuit 302 will now be described. Diode 320 serves to provide a ground reference at the input of inverter 312 whenever the diode is forward biased. The combination of resistor 322 and diode 324 serve to provide a timing circuit in combination with capacitor 326 for providing a relatively slow change in state of the output from inverter 316 during transitions from a high output state level to a low output state level, while also providing a rapid change in state of the inverter 316 output from a low level to a high level when proper system operation is re-established. Such COP circuits 302 are well known in the art.

The buffered RC Time Reset 328 includes capacitors 330, 332, resistor 334, and inverter 336, connected as shown and operated as described in the Z80 microprocessor operating manual. The purpose of the reset circuit 328 is to generate an active low signal a predetermined period of time after a power failure in order to reset the microprocessor 318.

Figure 21A:
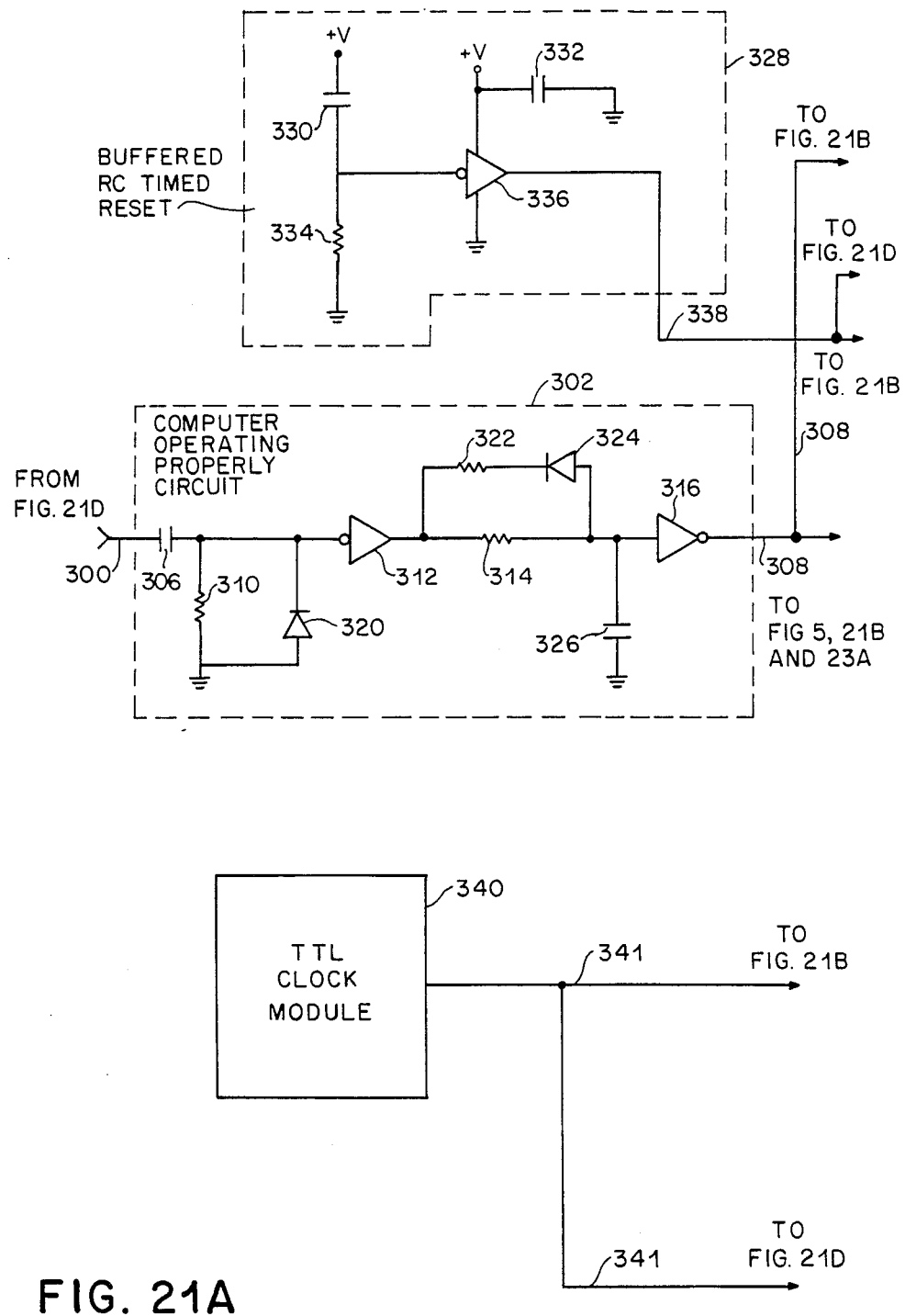

In FIG. 21A, a TTL Clock Module 340 is included for providing timing signals to the microprocessor 318 and other components. In the present system the frequency of the clock 340 is 4.0 MHz, for example.

Figure 21B:
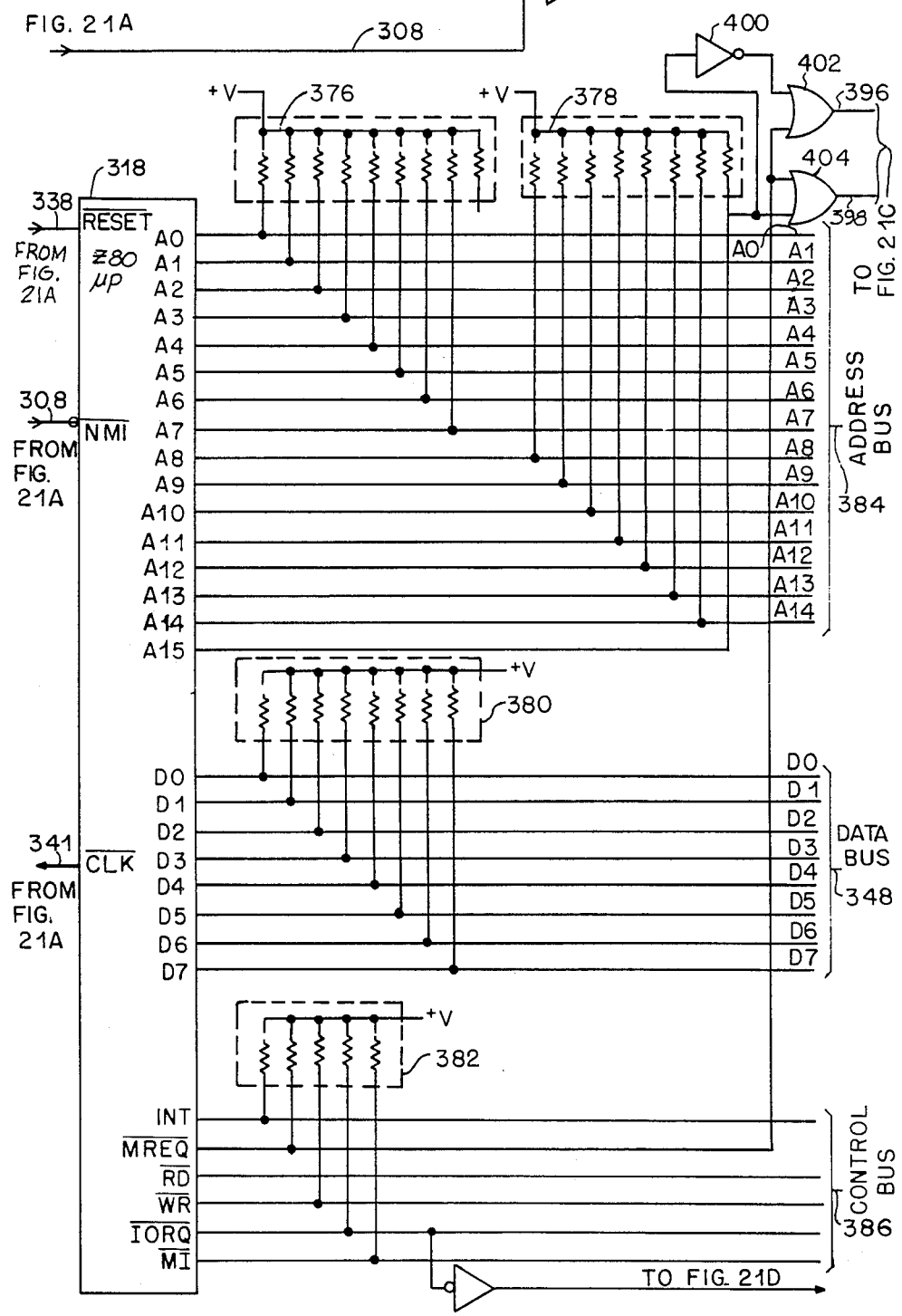
Figure 21C:
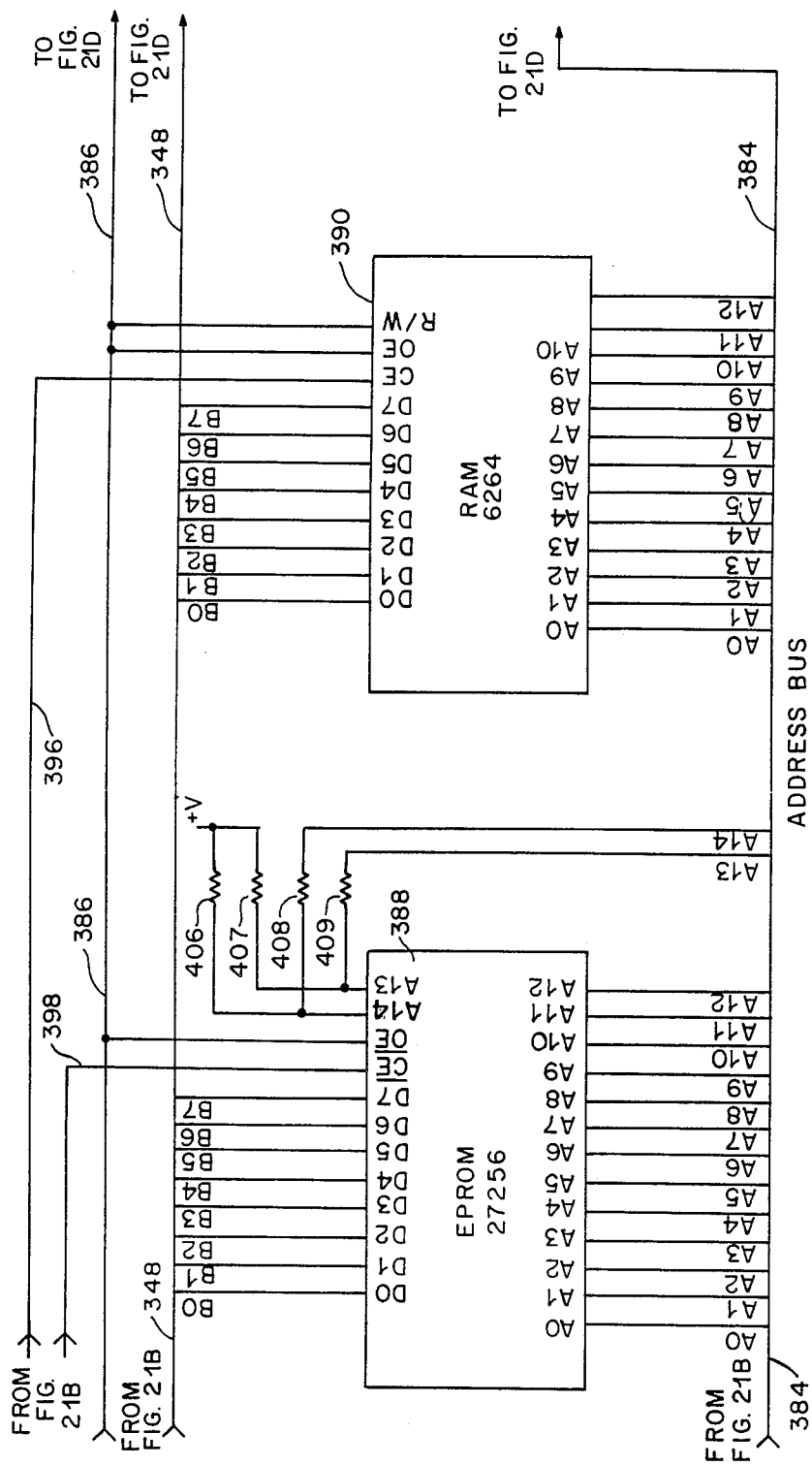
Figure 21E:
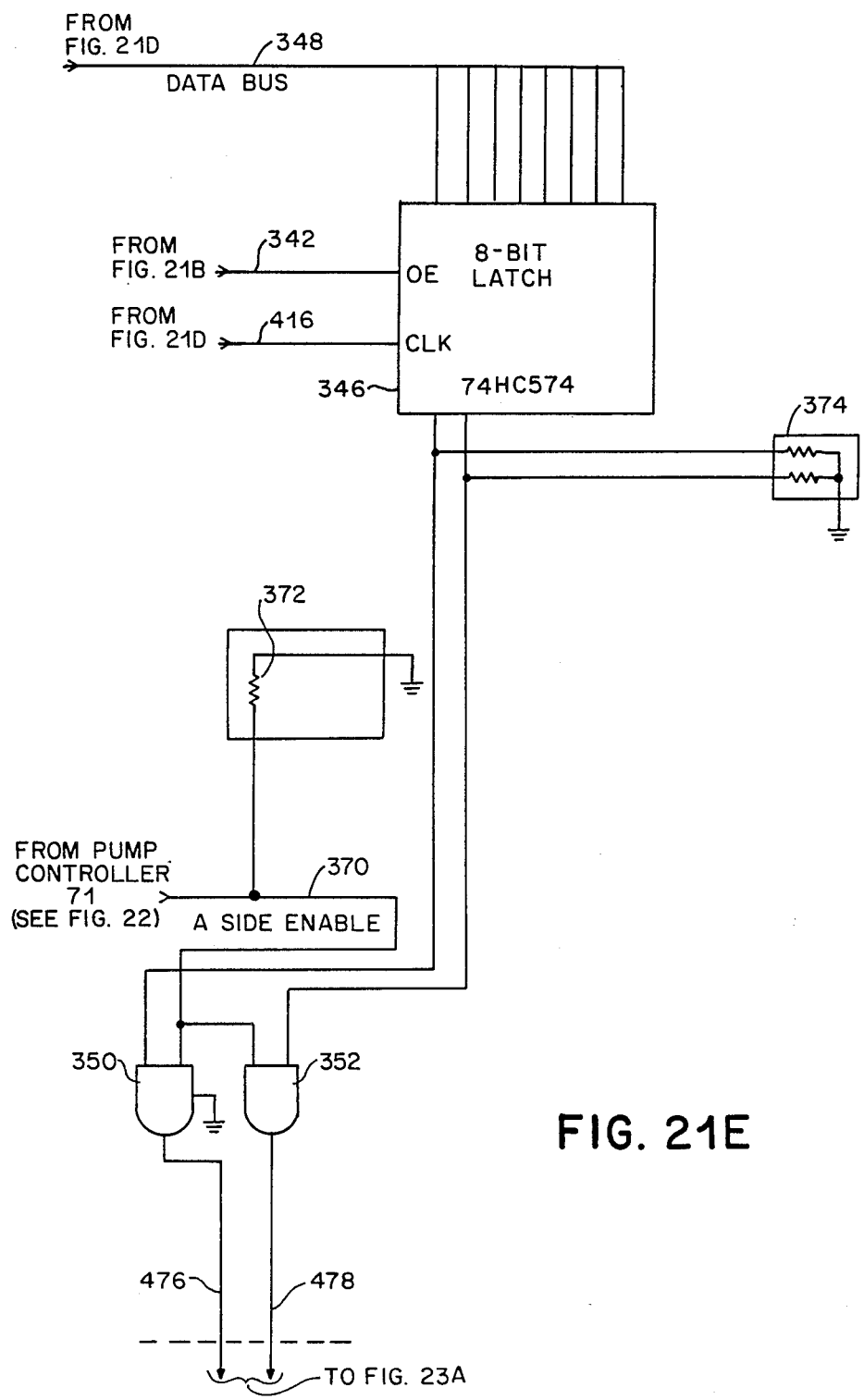

With reference to FIGS. 21A, 21B, and 21C, the output signal line 308 from the COP circuit 302 is also connected to an inverter 344 for providing an active high signal via output line 342 from inverter 344 to an 8-bit latch 346. In the event the system "crashes" or there is a program failure, the change in state of the output signal from the COP circuit 302 from high to low, causes the signal along line 342 to go high. In turn, the 8-bit latch responds by disabling the signal lines from data bus 348 from passing through the 8-bit latch 346 and AND gates 350 and 352 to the valve driver 75 (see FIGS. 21E and 23A). In this manner, during a system malfunction, the valves are prevented from operating to deliver gasoline or other product through the nozzle 41. Another failsafe feature in the system, in the event that the latch 346 malfunctions, or in the event of some other system malfunction other than a program malfunction, the pump controller 71 (see FIG. 2) supplies signals to AND gates 350 and 352, for terminating operation of the valves 11, 13, for example. Note that the signal line 370 ("A SIDE ENABLE") provides the signalling interconnect between the AND gates 350 and 352 with the pump controller 71. Also note that the signal line 370 is connected through a resistor 372 to ground, for providing a pull-down function in the event that the signal line 370 is inadvertently disconnected from the pump controller, in which event it is desired that the system valves 11 and 13 be immediately turned off. Another resistor 374 is shown in FIG. 21E for pulling-down the output signal lines from the 8-bit latch 346, in order to provide optimum operation.

With reference to FIG. 21B, resistor networks 376, 378, 380, and 382 provide a pull-up function to a positive supply voltage +V, as shown, for signal lines associated with the address bus 384, data bus 348, and the control bus 386, to provide optimum operation.

With reference to FIGS. 21B, 21C, and 21D, the address bus 384 from the Z80 microprocessor 318 provides signals for identifying objects or data in the microprocessor 318's address space for addressing EPROM 388, RAM 390 (see FIG. 21C), PIO (Parallel Input/Output) 392 (see FIG. 21D), the Z80A CTC (Counter Timer Chip) 394 and the 3-to-8 Decoder 304.

With further reference to FIG. 21A, the reset line 338 is also connected to the Z80A CTC (Clock Timer Chip) 394, for resetting this chip, subsequent to a power failure.

In FIG. 21B, inverter 400 and OR date 402 are connected as shown for providing an output signal line 396 for addressing RAM (Random Access Memory) 390. Also, OR gate 404 is connected as shown to the microprocessor 318 for providing a ROM access signal along output signal line 398 for accessing EPROM 388.

In FIG. 21C resistors 406 through 409, shown connected between EPROM 388 and a source of positive voltage +V, are configuration resistors for configuring the useable memory space within EPROM 388. As would be known to one of ordinary skill in the art, by removing certain ones of these resistors 406 through 409, the useable memory space in the EPROM 388 can be reduced for reducing the cost of the EPROM. In FIG. 21D, a resistor 410 is shown connected between the terminal designated IEI and a source of positive voltage +V. The resistor 410 is used to establish the interrupt priority for the system for giving the CTC 394 a higher priority than the PIO 392.

In FIG. 21D, the parallel input/output (PIO) 392 output lines B0 through B7, BRDY, and BSTB, are output lines for hydraulic data for inputting to a Port designated 3 (not shown) on the standard Gilbarco pump controller board 71. Also, control data input lines D0 through D7, READY, and ACK, are connected from Port 0 of the pump controller board 71 to PIO 392. In typical operation of the present system, the pump controller board 71 is preprogrammed to interrogate the PIO 392 via the control data lines for the purposes of starting transactions, controlling transactions, and terminating transactions. Data associated with hydraulic information such as preset blend amounts requested, preset volumes requested, the amount of volume of product being dispensed in real time, and the system's status are provided via the hydraulic data lines to the pump controller 71.

Figure 21F:
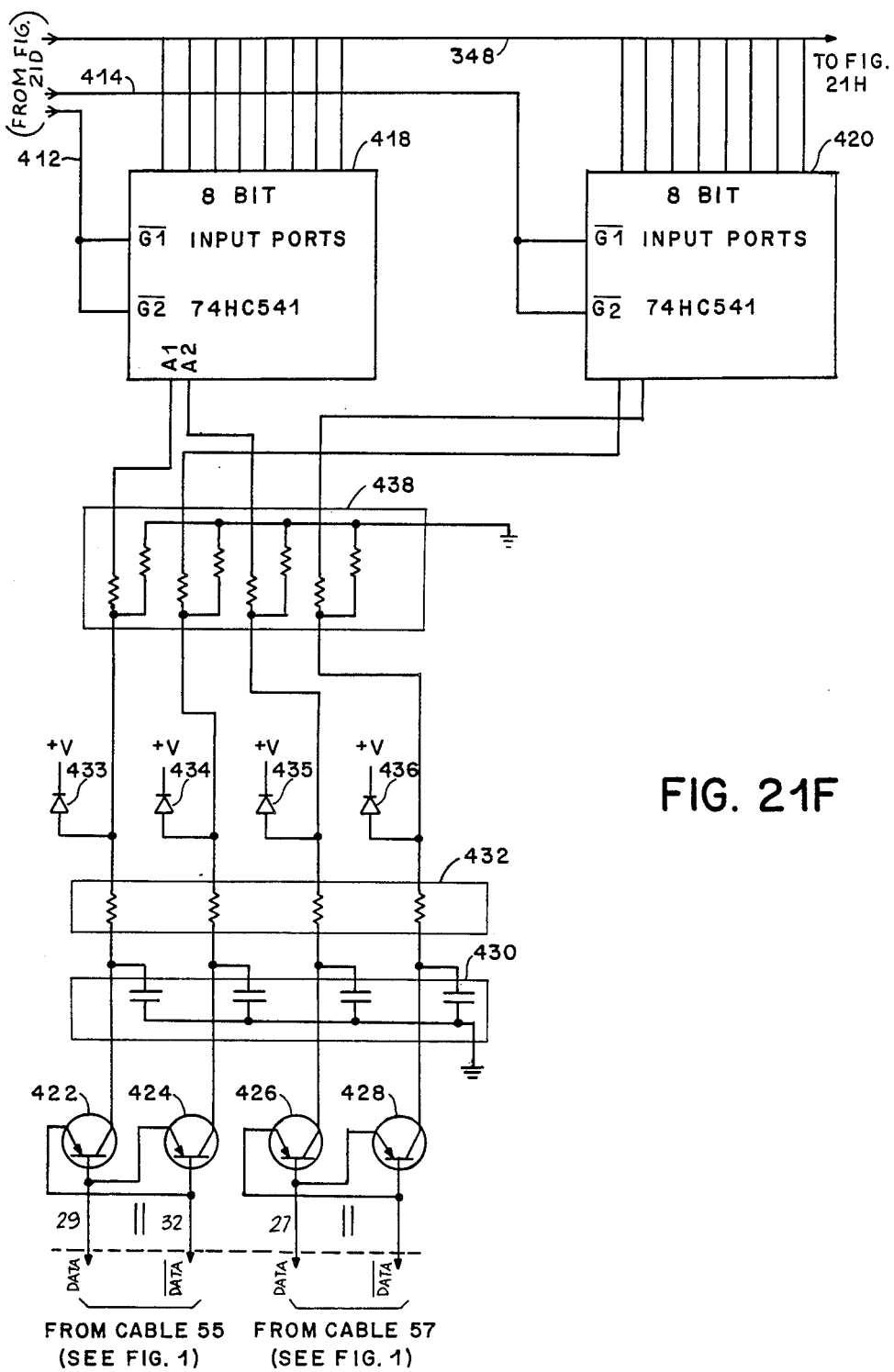

In FIG. 21F, input port 418 receives positive logic signals at port input terminals A1 and A2 from pulsers 27 and 29, respectively. Input port 420 receives inverted logic signals at input terminals A1 and A2 from pulsers 27 and 29, respectively. As shown, cable 55 provides both positive and inverted data signals from pulser 27 to voltage level translator transistors 422 and 424, respectively. The voltage translator transistors 422, 424 translate the data signals from about +180.0 volts to the logic supply voltage level of +5.0 volts, in this example (+V=5.0 VDC). Similarly, a positive logic signal and an inverted logic signal are provided from pulser 29 to voltage level translating transistors 426 and 428, respectively, as shown. The collectors of transistors 422, 424, 426, and 428 are connected to individual capacitors of a capacitor pack 430, as shown, for filtering purposes, and to current limiting resistors of a resistor pack 432, as shown. Diodes 433 through 436 serve as clamping diodes to insure that the voltage at the anode connection point of the diodes to individual resistors of resistor pack 432 never exceed the level of the supply voltage =V d.c. (5 volts d.c. in this case). Also connected along the pulser data lines between the input ports 418 and 420, and the resistor pack 432, are individual current limiting resistors of another resistor pack 438, as shown. During normal system operation, the input ports 418 and 420 are selectively operated via the system programming of the microprocessor 318 for permitting the microprocessor 318 access to the data from the pulsers 27 and 29, respectively.

Figure 21G:
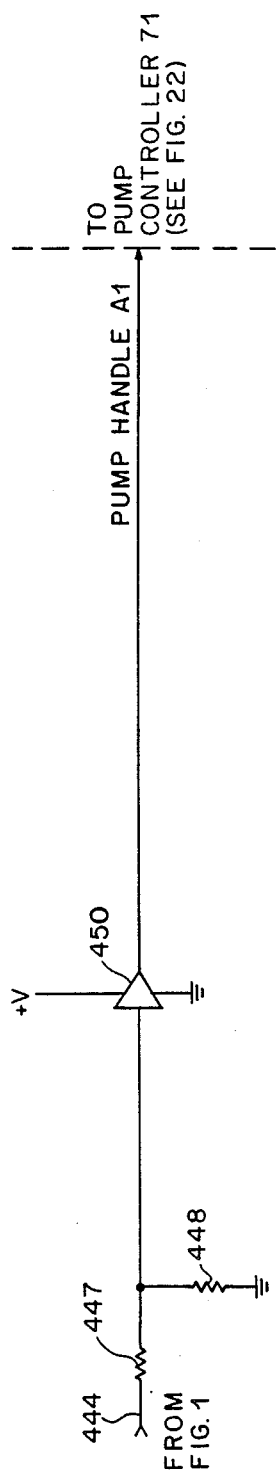

In FIG. 1, a nozzle boot 440 is shown pictorially with a pump handle element 442 that includes a SPST (single-pole single-throw) switch 443 operated by the pump handle 442, whereby when the nozzle 41 is inserted into the boot 440, the lower portion of nozzle 41 will push against the pump handle 442 causing the handle 442 to move counter-clockwise, causing the SPST switch 443 to open, for signalling the end of d transaction via a signal line 444 (see FIG. 21G). When a new transaction is to be initiated, the nozzle 41 is removed from the boot 440, and the pump handle 442 must be manually rotated in the direction of arrow 446 (clockwise in this example), for closing the SPST switch 443 for applying a +12.0 VDC signal, in this example, along signal line 444. The 12 volt d.c. signal is coupled via the isolation resistors 446 and resistor 448 to a CMOS buffer or level shifter 450, for changing the voltage level of the +12 VDC signal to the logic level of +5 volts d.c., in this example, to Port 2 (not shown) on the pump controller board 71. When the pump controller board 71 receives the initiation of operation signal, operation of the system may then be initiated for delivering product via nozzle 41 to a receiving tank (not shown).

As previously mentioned, the pump controller 71 is a standard controller board having part number T15841, as manufactured by Gilbarco, Inc., located in Greensboro, N.C. In FIG. 22, the interconnection of this standard pump controller board assembly 71 is shown with connector pin numbers and the standard pump controller nomenclature, as related to the corresponding nomenclature used for the present invention, for interconnection to the hydraulic interface board 73. On the standard Gilbarco Pump Controller Board 71, a 60 pin printed circuit board connector designated on the board 71 as "P205", as shown, is mounted on the board 71. The numbers 1 through 60 shown to the right of the arrows for the connector P205 are the actual pin numbers associated with that connector. The mating flat cable connector shown in FIG. 22 as J205 is mated to a flat cable 460 having another female connector, designated as J102, at its other end for connection to a 60 pin printed circuit board connector designated as P102 on the hydraulic interface board 73. The 60 pin male and female circuit board connectors P205, J205, J102, and P102, are standard type 60 pin PCB or printed circuit board connectors available from a number of manufacturers.

Figure 21H:
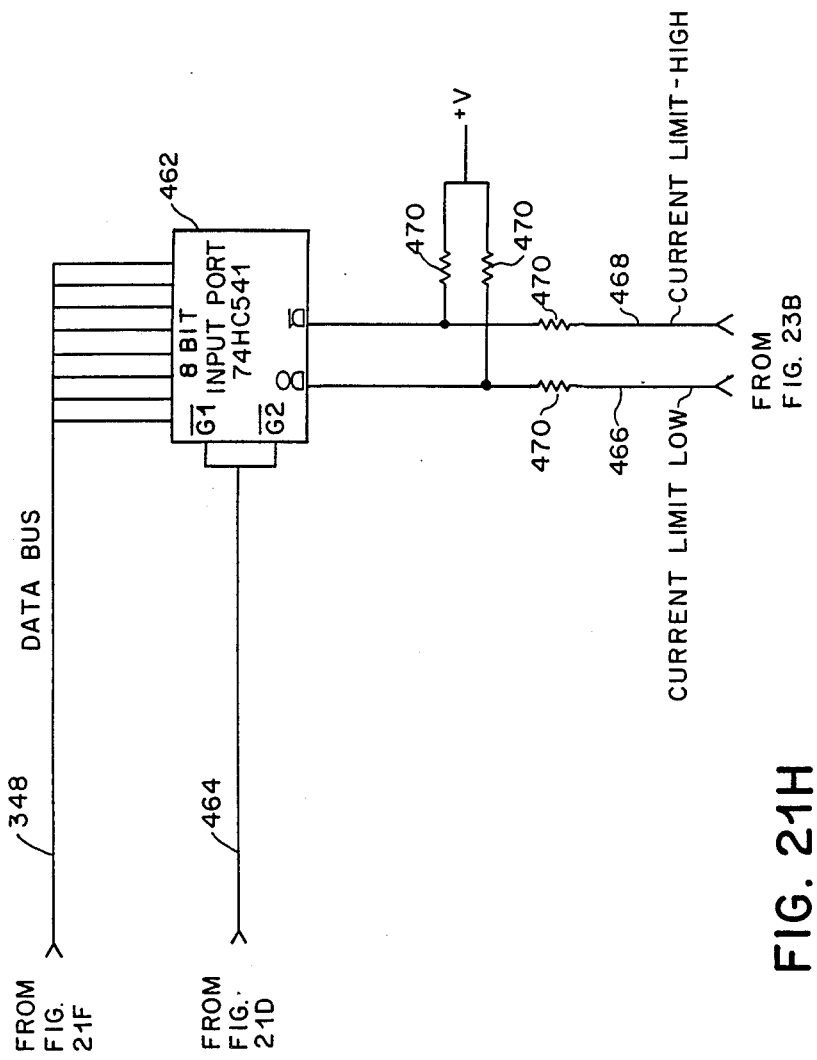

With reference to FIG. 21H, an 8 bit input port 462 receives a signal CE2 along signal line 464 (see FIG. 21D) from decoder 304, for operating the input port 462 to pass through the "current limit A low" and "current limit A high" signals to the data bus 348. The two current limit signals are provided to the input port 462 via signal lines 466 and 468, and via isolation resistors 470 connected between the signal lines 466, 468, and the input port 462, and a source of voltage +VDC. The current limit signals "A low" and "A high" are received from a valve driver board 75, shown in detail in FIG. 23B.

Figure 23A:
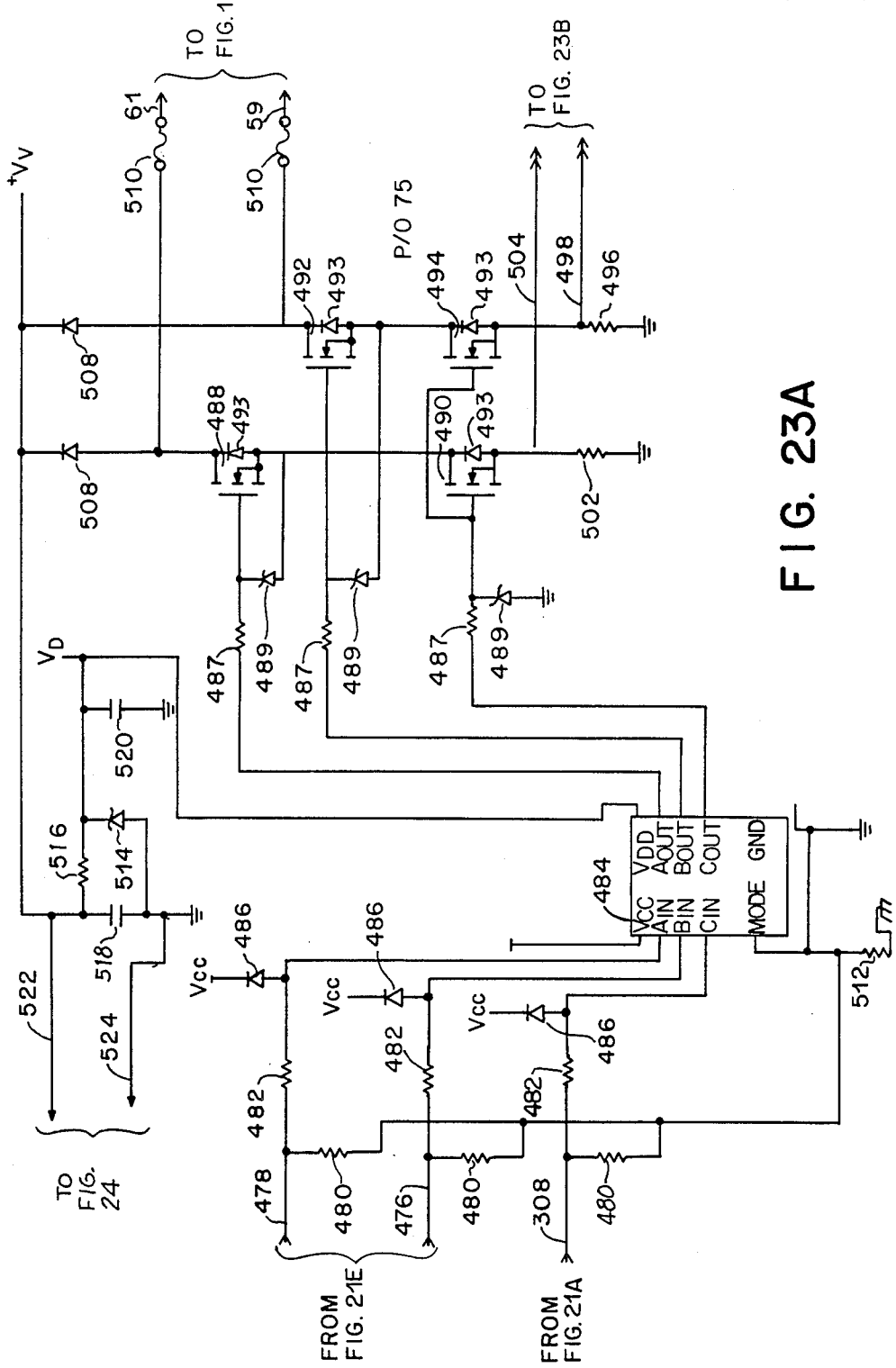
FIGS. 23A through 23C show a circuit and logic schematic diagram for the valve driver board of one embodiment of the invention.
Figure 23B:
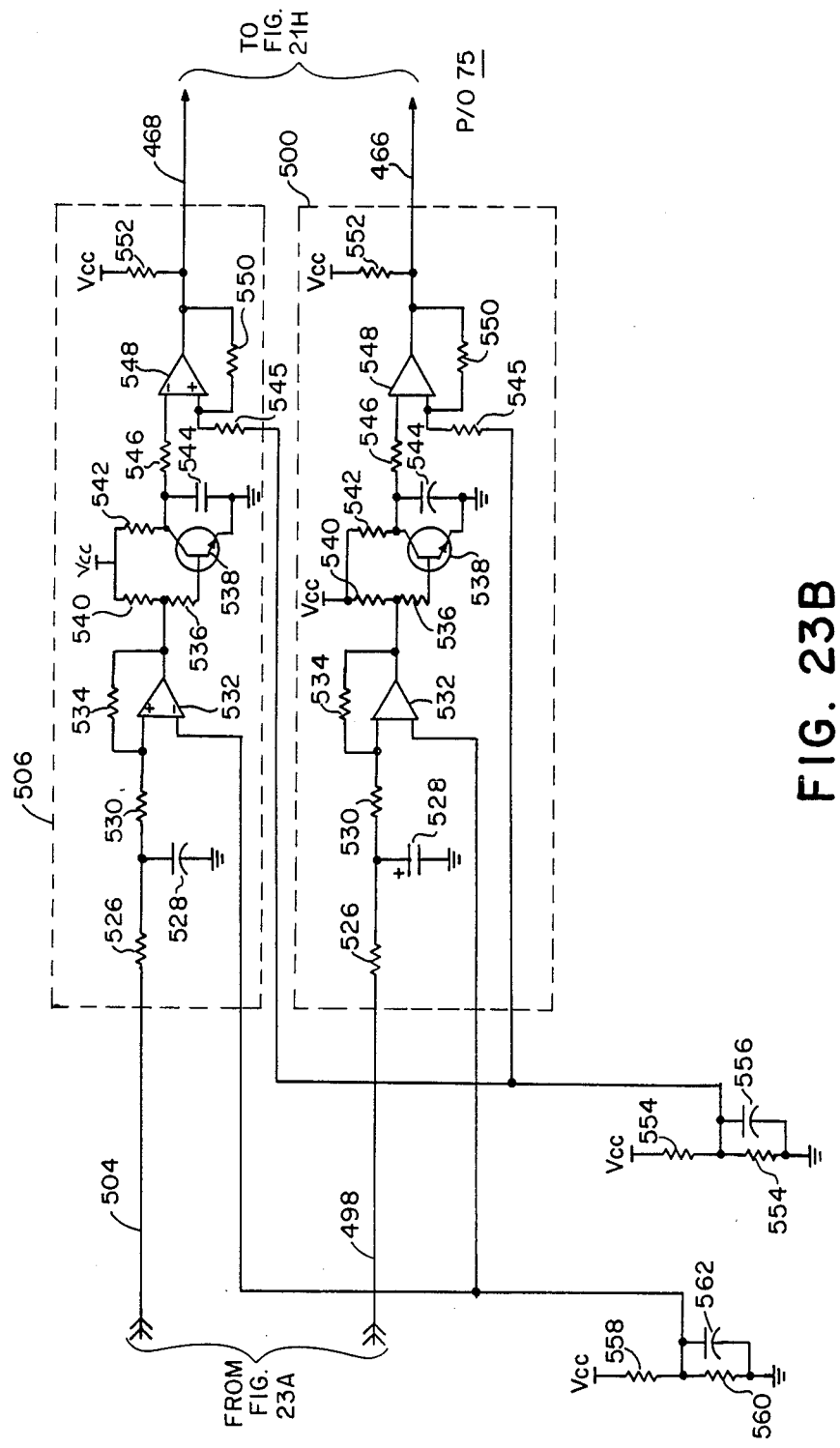
Figure 23C:
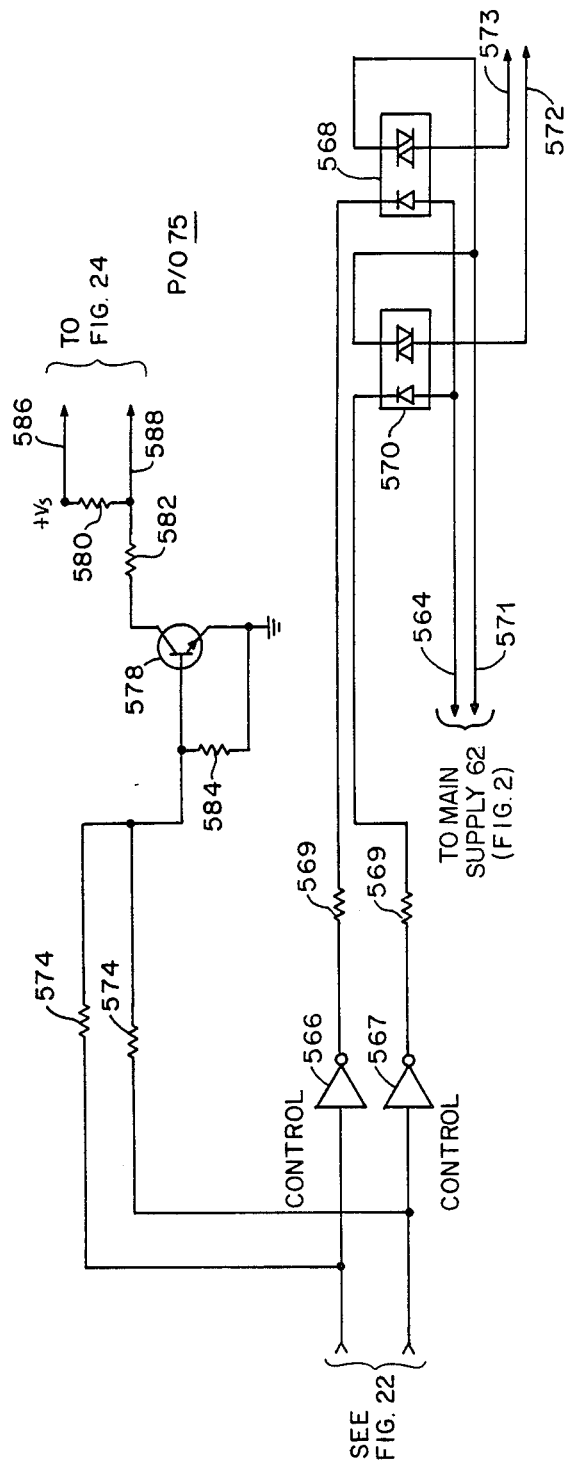

In FIG. 23A, 23B, and 23C, the valve driver board 75 is shown in detail. In FIG. 23A, signal line 476 provides the first product control signal, for low octane flow control, for example, to the valve driver 75. Signal line 478 provides the second product valve control signal, such as a high octane flow control, for example, from AND gate 352, as shown. Grounding resistors 480 are shown connected between the signal lines 308, 476 and 478, respectively, and a chassis or logic ground potential point. Isolation resistors 482 are connected for coupling the signal lines 476, 478, and 308 to a level shifter 484 (in this example, the level shifter is provided by a CMOS integrated circuit 4504). Note that VCC is a logic level voltage, typically +5 volts d.c. Clamping diodes 486 are connected between the inputs of the level shifter 484 and the logic voltage VCC, for insuring that the input terminals to the level shifter 484 never have applied to them a voltage greater in amplitude than VCC. Resistors 487 couple the gate electrodes of CMOS switches 488, 490, 492, 494, respectively, to the associated output lines of level shifter 484. Zener diodes 489 are connected across the gate and channels of each one of CMOS switches 488, 490, 492, and 494, respectively, to limit the voltage thereacross. Also, diodes 493 are connected across the source and drain electrodes of the CMOS switches 488, 490, 492, and 494, respectively.

The level shifter 484 operates to, in this example, change the level of voltage of the input signals it receives from 5 volts d.c. to 12 volts d.c. for driving field effect transistors 488, 490, 492, and 494, respectively. When a transaction is in progress, an enable signal is provided along input line 308 from hydraulic interface board 73. The signal is level shifted by level shifter 484 and applied to field effect transistors 490 and 494, for turning these transistors on for permitting field effect transistors 488 and 492 to thereafter be selectively operated for controlling the operation of valves 11 and 13, respectively. Note that when field effect transistor 488 is turned on, it applies a ground via signal line 61 to turn on valve 13, and that when field effect transistor 492 is turned on it applies a ground via signal line 59 to valve 11 (provided field effect transistors 490 and 494 are tuned on). When the first product related valve 11 is turned on, current flows through sensing resistor 496, which develops a voltage thereacross that is applied via signal line 498 to a level sense circuit 500 (see FIG. 23B). Similarly, when current is flowing through a sensing resistor 502 at times that valve 13 is on for permitting flow of the second product, the voltage developed across sensing resistor 502 is applied via signal line 504 to another voltage level sensing circuit 506.

Note also in FIG. 23A the use of clamping diodes 508 for insuring that the voltage across the series connected main current paths of field effect transistor pairs 488 and 490, and 492 and 494, respectively, does not exceed the valve voltage $V_v$, in this example, +35 volts d.c., for operating the valves 11 and 13. In effect, diodes 508 serve to clamp the kickback voltage to the +35 volt d.c. supply, during turnoff of valves 11 and 13, in this example. The control lines 59 and 61 also are fused via fuses 510, as shown.

Figure 24:
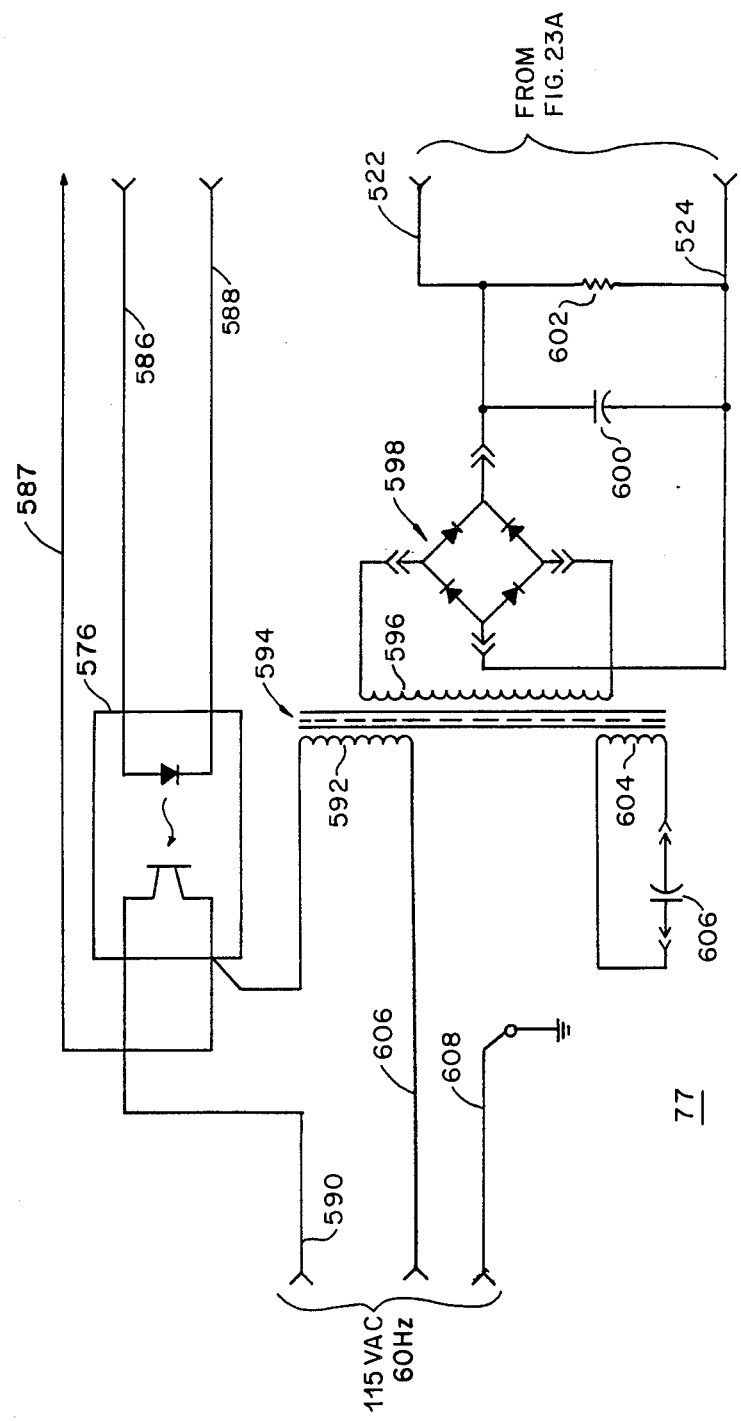
FIG. 24 shows a circuit schematic diagram of a valve power supply for one embodiment of the invention.

With reference to FIG. 23A, a resistor 512 is used to interconnect earth and chassis grounds, as shown. Also, a zener diode 514 is connected as shown between a point of reference potential and the $+V_V$ supply, for providing a voltage $V_D$, +10 volts d.c., in this example. A current limiting resistor 516 is connected to insure that the zener diode 514 is not overdriven. A filter capacitor 518 is connected for filtering noise from the $=V_V$ supply, whereas another filter capacitor 520 is connected for filtering noise from the $V_D$ supply voltage. Note that conductors 522 and 524 are connected to the valve power supply 77 shown in detail in FIG. 24.

With further reference to FIG. 23B, note that the voltage level sensing circuits 500 and 506 are identical. Each includes the combination of resistor 526 and capacitor 528 to integrate associated sensed voltages (in the form of pulse width modulated signals) from signal lines 498 and 504, respectively. The integrated signal is then applied via input resistor 530 to operational amplifier 532. A feedback resistor 534 is used in combination with input resistor 530 for determining the hysteresis of the operational amplifier 532. The output of the operational amplifier 532 is applied via a resistor 536 to the base of NPN transistor 538. The combination of series connected resistors 540 and 536 are used to bias the base of transistor 538 from the $+V_{CC}$ voltage supply, as shown. Also, a collector resistor 542 is connected between the collector of transistor 538 and the $+V_{CC}$ supply. A capacitor 544 is connected across the collector and emitter electrodes of transistor 538. Also, the collector of transistor 538 is connected via resistor 546 tp the inverting terminal of operational amplifier 548 The non-inverting and output terminals of amplifier 548 are connected via a feedback resistor 550. Also, the output terminal of operation amplifier 548 is connected via resistor 552 to the voltage supple $+V_{CC}$.

In typical operation of the voltage level sensing circuit 500, for example, when the current sensed across resistor 496 produces a voltage of 1.1 volts d.c. or greater across resistor 496, the output state of operational amplifier 532 is changed from a low level to a high level, in turn causing NPN transistor 538 to turn on for discharging capacitor 544. When the charge on capacitor 544 decreases to a relatively low value, operational amplifier 548 responds by changing the level of its output voltage from a low level to a high level. The high level signal is carried by signal line 466 to the input port 462 (see FIG. 21H). Microprocessor 318 is programmed to read the current limit signals. The voltage on control line 464 goes low to cause the input port 462 to switch through the signal on signal line 466 to the data bus 348. If the microprocessor detects a high level current limit signal, it operates to reduce the duty cycle of operation of valve 11 as shown in the program module "valve control" of FIG. 17. The level sensing circuit 506 operates in a similar manner for controlling the duty cycle of valve 13, to prevent overdriving of that valve.

Note further in FIG. 23B in the level shifting circuit 500, a resistor 545 connecting the non-inverting terminal of operational amplifier 548 to a bias voltage equivalent in this example to half of the supply voltage $V_{CC}$, via the series voltage divider formed by resistors 554, 554. The capacitor 556 provides filtering of the reference voltage that is so developed. Another voltage divider circuit including resistors 558 and 560, in combination with a filter capacitor 562, connected as shown to provide a reference voltage from the $+V_{CC}$ voltage supply (but of reduced value) to the inverting input terminal of the operational amplifier 532 of the level sensing circuits 500 and 506.

With reference to FIG. 23C, the pump controller 71 senses the activation of the SPST switch 443 via appropriate movement of the pump handle 442 to a initiate new transaction position, as previously described, for providing positive voltage or control signals on the control lines designated "STP1 Control" and "STP2 Control", which signals pass through open collector drivers 566 and 567, respectively, for turning on solid state relays 568 and 570, respectively, for providing in this example, 115 volts a.c. along output power lines 572 and 574, respectively, for providing power to associated submersible turbine pumps (not shown), respectively.

The outputs of the drivers 566, 567 are connected via coupling resistors 569 to the inputs of optocouplers 570 and 568, respectively. Also, the "STP1 Control Signal" and "STP2 Control Signal" are applied via resistors 574 and 576, respectively, to the base of NPN transistor 578, for turning on this transistor 578, causing a voltage to be developed across resistor 580 connected in series with resistor 582 between the collector of transistor 578 and a voltage $+V_S$ (14.5 volts d.c., in this example). Note also the bias resistor 584 between the base and emitter of transistor 578, for developing the appropriate base voltage for operating transistor 578. When transistor 578 turns on, the voltage developed across resistor 580 is connected via voltage lines 586 and 588 to solid state relay 576 of the valve power supply 77 (see FIG. 24). The voltage developed across resistor 580 causes the solid state relay 576 to turn on for supplying 115 volts a.c. from voltage line 590 to the primary winding 592 of transformer 594 for supplying the d.c. voltage for operating the valves 11, 13 along voltage lines 522 and 524. The secondary winding 596 of transformer 594 is connected across a full-wave diode bridge 598. The d.c. output voltage from the bridge is connected across a filter capacitor 600 and bleeder resistor 602, for providing the d.c. voltage for operating the valves 11, 13. Note that transformer 594, in this example, is a ferro-resonant transformer, and requires the use of a resonating winding 604 connected in parallel with a resonating capacitor 606, for maintaining the transformer 594 in saturation at all times of operation, for maintaining a stable output voltage. Note that power line 590 is the "hot" lead for the 115 volt a.c. supply, whereas power lie 606 is the neutral power line for the 115 volt a.c. supply. Also, power line 608 represents the earth ground for the 115 volt a.c. supply.

A typical product distribution cycle will now be described in detail with reference to the drawings. Initiation of an operating cycle is made by first having an operator lift the nozzle 41 from the nozzle boot or holder 440 and thereafter moving, in this example, the pump handle 442 in the clockwise direction of arrow 446. As previously mentioned by moving the pump handle 442 in a upward clockwise direction, the operator causes the SPST switch 443 attached to the pump handle 442 to close for signalling that a new cycle of operation is to be initiated. The operator then places the nozzle 41 into the receiving tank (not shown), such as the inlet port for a gasoline tank of an automobile, for example. Next, the operator presses one of the blend select buttons 47 to select the appropriate blend. The pump controller 71 is pre-programmed to cyclically pole all of the switches 47 associated with the control module 1, the pump handle 442, and other switches in the system. Accordingly, when the particular blend select switch 47 is pressed, the pump controller 71 will sense the activation of that particular switch 47 and the blend ratio to the hydraulic interface board 73 in a predetermined protocol in order to start the transaction.

The blend data transmitted to the hydraulic interface board 73 from the pump controller board 71 is stored in RAM 390 (see FIG. 21C). Also, the process control software or programs for controlling the actual blending process, as shown in Figures 9 through 18, are stored in the EPROM 388 (see FIG. 21C). Note that on initial power-up of the system, as shown in FIG. 9, the main program is first operative to initialize the system. The system initialization program is shown in FIG. 10. After system initialization, the system is primed to conduct successive transactions.

For a new transaction to be initiated, as previously mentioned, an operator removes the nozzle 41 from the boot 440 and lifts up the pump handle 442, for causing the SPST switch 443 to close, or in turn causing a signal to be transmitted via signal line 444 to the pump controller board 71. When the operator next presses one of the select switches 47, the pump controller board 71 senses the selected blend and sends down the associated blend ratio data signal via a predetermined protocol to the hydraulic interface board 73.

More specifically, the blend select data signal is sent to RAM 390 for storage and subsequent involvement with various blend cycle programming to be described. Next, as shown in the SYS-STAT of FIG. 11, the transaction is initiated after interrogation of the system for new transaction data. Note that during the "Load Data Structure And Said Active Nozzle Flag" subroutine, an initialization is made for setting the positions of valves 11 and 13 at predetermined openings, typically 55 and 45 percent open, respectively. These are initial openings for beginning the distribution process. After the load/data and so forth routine is accomplished, as shown, a value of 1 is returned to the main program of FIG. 9. As shown in the main program, when the return value is 1, the loop control process program shown in FIG. 12 is initiated. An interrupt routine in initiated for reading the data or pulses being delivered from pulsers 27 and 29. The pulses from pulsers 27 and 29 are stored in a buffer memory position in RAM memory 390.

As shown in FIG. 12, the buffer memory positions are addressed and used to compute the ideal pulse ratios for each buffer quantity of pulses. Note that in FIG. 12, the "A" pulse count is that associated with pulser or meter 27, and the "B" pulse count is associated with the pulser 29. Note that prior to examining the pulse buffers, as shown in FIG. 12, the Preset Query routine of FIG. 13 is performed to terminate a transaction on a set volume as sent by pump controller board 71 via a predetermined protocol. Also, note that the ratio track routine of FIG. 14, as indicated in the loop control program of Figure 12 is used to calculate the theoretical volumes for the accumulated pulses.

With further reference to the loop control program of FIG. 12, the next program step is a sub-routine shown as "Calculate Ratio Errors A and B" or simply "RATIO ERR", shown in the sub-routine program of FIG. 15. At this point in the operation, the actual volumes accumulated from the pulsers 27 and 29 in the buffer memories are compared to the theoretical volumes generated by the "RATIO TRK" program module shown in FIG. 14. The errors are calculated for each of the two products as shown in the "RATIO-ERROR" sub-routine of FIG. 15.

Next, during the delivery of the first gallon of product from the nozzle 41, the RATIO-ERROR routine of FIG. 15, calls for the sub-routine "STARTUP" of FIG. 16 for causing the initial ramping of the valve openings as previously described for the ramping curves given as an example in FIG. 19.

After a gallon of fuel or product is delivered, the RATIO-ERROR routine then calls for the sub-routine "VALVE CNTRL" shown in FIG. 17. As shown in the sub-routines of FIG. 16 and FIG. 17, each routine processes the error rom the RATIO-ERROR program of FIG. 15 into an associated valve position for each one of the valves 11 and 13. Also, note that in the "VALVE CONTROL" sub-routine of FIG. 17, after the valve positions are established, the RESIDUAL sub-routine is called for, as shown in FIG. 18, and as previously described.

Next, the programming control is returned to the "SYS STAT" of FIG. 11, where the current system status is interrogated as dictated by the pump controller board 71. If the pump controller board 71 has not signalled that there is an end of transaction or a stop operation signal, then the operation is continued through the cycling as previously described, for continuing the current transaction using the programming controls as previously indicated.

Note in the "PRESET QUERY" of FIG. 13, the routine is premised on an operator having pressed a switch (not shown) for selecting a predetermined quantity of fuel or fluid product to be delivered to a receiving tank. If the preset quantity is nearing completion of delivery, or if pump handle 442 is lowered (the nozzle 41 has been returned to boot 440), the pump controller board 71 will respond to the opening of the SPST switch 443 on the pump handle 442 by signalling to the hydraulic interface board 73 that the transaction has been completed. This is detected in the SYS STAT sub-routine via the "end of transaction" interrogation step. If an end of transaction signal is detected, then as shown in the SYS STAT sub-routine, the sub-routine proceeds to direct that the pumps be stopped and the valves 11, 13 closed.

As previously mentioned, a predetermined protocol is required for establishing communication between the Pump Controller Board 71 and the hydraulic interface board 73. With reference to FIG. 21D, the PIO, that is parallel input/output peripheral chip 392 has an input port for receiving the control data, and an output port for the hydraulic data, as shown, in its communication with the Pump Controller Board 71. The protocol for establishing this interface will be described in the following paragraphs.

A two-level description of the protocol between the PIO 392 and the Pump Controller Board 71 will now be given. The first level entitled "Message Level Description" details the command contents of messages, and a second level the "Link Level Description" finds the format in which messages are transferred, as follows:

I. Message Level Description

Message data transfer between the Pump Controller Board 7 and the Interface Board 73 is conducted with text data coded in modified HEX (Bit 7 set to 1). As a result, transparency is not required.

---

1. Status Request:
   Pump Controller Board    Interface Board

20H Block Code→

←  { 20H Block Code
        XXH Error Code Side A*
        XXH Error Code Side B*
        (80H IF NO ERROR) }

*Sides A and B relate to gasoline pumps having dual product distribution capability. Only side A of interest in this example.

---

2. Power Up Status Request:
   Pump Controller Board    Interface Board

21H Block Code→

←  { 21H Block Code
        XXH Error Code Side A
        XXH Error Code Side B
        (80H IF NO ERROR)
        XXH Version Number MSB
        XXH Version Number LSB }

---

3. Start Transaction:
   Pump Controller Board    Interface Board

31H Block Code
   8XH Pump Side
   (1=Side A / 2=Side B)
   XXH Preset Transaction Pulse Count Byte 1*
   XXH Preset Transaction Pulse Count Byte 2
   XXH Preset Transaction Pulse Count Byte 3
   XXH Blend**
   →

*The three bytes for the Preset Transaction Pulse Count are set up as follows:
Byte 1 - Most significant 7 bits of pulse count
Byte 2 - Second most significant 7 bits of pulse count
Byte 3 - Least significant 7 bits of pulse count
**The Blend data is a percentage of low octane product (0–100) in whole numbers, in the example where the products being blended are high and low octane gasoline.

---

4. Stop Transaction:
   Pump Controller Board    Interface Board

32H Block Code
   8XH Pump Side
   (1=Side A / 2=Side B)
   →

←  { 32H Block Code
        8XH Pump Side (1=Side A / 2 = Side B)
        XXH High Product Transaction Pulse Count Byte 1*
        XXH High Product Transaction Pulse Count Byte 2**
        XXH High Product Transaction Pulse Count Byte 3***
        XXH Low Product Transaction Pulse Count Byte 1
        XXH Low Product Transaction Pulse Count Byte 2
        XXH Low Product Transaction Pulse Count Byte 3
        XXH Pure Product Transaction Pulse Count Byte 1
        XXH Pure Product Transaction Pulse Count Byte 2
        XXH Pure Product Transaction Pulse Count Byte 3
        XXH Blend (Percentage of Low Product) }

*Byte 1 = Most significant 7 bits of pulse count
**Byte 2 = Second most significant 7 bits of pulse count
***Byte 3 = Least significant 7 bits of pulse count

---

5. Send Pulser Count:
   Pump Controller Board    Interface Board

33H Block Code →

←  { 33H Block Code
        XXH Pulser Count Side A High Product*
        XXH Pulser Count Side A Low Product
        XXH Pulser Count Side A Pure Product**
        XXH Pulser Count Side B High Product
        XXH Pulser Count Side B Low Product
        XXH Pulser Count Side B Pure Product
        XXH Valve Status*** }

*The pulser counts are broken up as follows:

| Bit | Contents |
|---|---|
| 0-5 | Pulser Counts (0–63) |
| 6 | Pulser Error (0=No Error / 1=Pulser Failure) |

**Pure product relates to dispensing unblended fuel, i.e., only low or only high octane gasoline, for example.
***The valve status indicates whether the valves are active or inactive:

| Bit | Contents |
|---|---|
| 0 | Side A Valve Status (0=OFF / 1=ON) |
| 1 | Side B Valve Status (0=OFF / 1=ON) |
| 2-6 | Unused |

---

6. Pump Stop (E-Stop):
   Pump Controller Board    Interface Board

34H Block Code
   8XH Pump Side
   (1=Side A / 2=Side B)
   →

---

7. Restart After Pump Stop (Estop):
   Pump Controller Board    Interface Board

35H Block Code
   8XH Pump Side
   (1=Side A / 2=Side B)
   →

---

8. Historical Data Storage:
   Pump Controller Board    Interface Board

51H Block Code →

←  { 51H Block Code
        XXH Historical Data Byte 1 MSN
        XXH Historical Data Byte 1 LSN
        XXH Historical Data Byte N MSN
        XXH Historical Data Byte N LSN }

The Historical Data is sent using 2 bytes for each byte of data. The first byte contains the upper nibble of the data and the second byte contains the lower nibble of the data.

---

9. Historical Data Restore:
   Pump Controller Board    Interface Board

61H Block Code
   XXH Historical Data Byte 1 MSN

| -continued |  |
|---|---|
| XXH Historical Data Byte 1 LSN | |
| XXH | |
| XXH | → |
| XXH Historical Data Byte N MSN | |
| XXH Historical Data Byte N LSN | |

The Historical Data is sent using 2 bytes for each byte of data. The first byte contains the upper nibble of the data and the second byte contains the lower nibble of the data.

10. Memory Dump:

| Pump Controller Board | Interface Board |
|---|---|
| 71H Block Code → | |
| ← { 71H Block Code | |
| Format to be determined | |

II. Link Level Description

The link level of the interface is of a standard type for intra-device data transfer. It is a Point-to-Point communications link providing for link establishment, normal data transfer, error detection and time-outs. Standard ASCII characters will be used for protocol characters (STX, ETX, ENQ, ACK, NAK, CAN). The master Device is in control of the transfer at all times. The Slave Device will never make a determination that retries have been exhausted.

1. Definitions:
   a. BCC - This is an LRC type calculation to ensure data integrity. The calculation involves exclusive-ORING (XOR) the text data plus the ETX.
   b. Time-outs - Turnaround time - time between message being sent and the response.
   c Intercharacter Time-out - Time between characters of a message.

2. System Specifications:
   a. Time-out Values:
      1. Turnaround Time-out - 10 milliseconds
      2. Intercharacter Time-out - 10 milliseconds
   b. Limits:
      1. NAK Limit - This is the number of consecutive Negative Acknowledgments received by the Master controller before aborting the data transfer. The NAK limit will be 3.
      2. BID Limit - This is the number of consecutive Negative Acknowledgments received by the Master controller when trying to establish a link. The BID limit will be 3.
      3. Turnaround Time-out Limit - This is the number of consecutive Turnaround time-outs encountered by the transmitting station. The limit is 3.

3. Link Establishment:
   a. Ready To Receive:
      | Pump Controller Board | Interface Board |
      |---|---|
      | <SOH><ENQ>→ | |
      | | ← <ACK> |
   b. Not Ready To Receive:
      | Pump Controller Board | Interface Board |
      |---|---|
      | <SOH><ENQ>→ | |
      | | ← <EOT> |

4. Message Transfer:
   a. Normal Transfer:
      | Transmitting Station | Receiving Station |
      |---|---|
      | <STX>text<ETX><BCC>→ | |
      | | ← <ACK> |
      | <EOT>→ | |
   b. Transfer With Errors Detected (Transmitting Station is Pump Controller Board 71)
      | Pump Controller Board | Interface Board |
      |---|---|
      | <STX>text<ETX><BCC> —ERRORS→ | |
      | | ←<NAK> |
      | <STX>text<ETX><BCC> —ERRORS→ | |
      | | ←<NAK> |
      | <STX>text<ETX><BCC> —ERRORS→ | |
      | | ←<NAK> |
      | <EOT>→ | |
   c. Transfer With Errors Detected (Transmitting Station is Interface Board 73)
      | Interface Board | Pump Controller Board |
      |---|---|
      | <STX>text<ETX><BCC> —ERRORS→ | |
      | | ←<NAK> |
      | <EOT>→ | |

If the Pump Controller Board 71 detects an error in transmission and sends a <NAK> to the Interface Board 73, the Pump Controller Board 71 must retransmit the request. The <EOT> sent by the Interface Board 73 will assure the Pump Controller Board 71 that the <NAK> was received and the Interface Board 73 data will be retained and retransmitted retransmitted when the next command is received.

| <STX>text<ETX><BCC> —ERRORS→ | |
   |---|---|
   | | ←<CAN> |
   | <EOT>→ | |

If after 3 retries the Pump Controller Board 71 has not received the message correctly from the Interface Board 73, a cancel message <CAN> command is sent to the Interface Board 73 which responds with an end of transmission <EOT>. This informs the the Interface Board 73 that the data being retained may be discarded.

5. Enquire Sequence:
   a. Lost Or Garbled ACK:
      | Transmitting Station | Receiving Station |
      |---|---|
      | <STX>text<ETX><BCC>→ | |
      | | ←ERRORS — <ACK> |
      | <ENQ>→ | |
      | | ← <ACK> |
      | <EOT>→ | |
   b. Lost Or Garbled NAK
      | Pump Controller Board | Interface Board |
      |---|---|
      | <STX>text<ETX><kBCC>—ERRORS→ | |
      | | ←ERRORS — <NAK> |
      | <ENQ>→ | |
      | | ← <NAK> |
      | <STX>text<ETX><BCC>→ | |
      | | ← <ACK> |
      | <EOT>→ | |

The enquire sequence is useable with any control byte (<ENQ>, <ACK>, <NAK>, <CAN>, OR <EOT>).

6. BID Limit Exceeded:
   | Pump Controller Board | Interface Board |
   |---|---|
   | <SOH><ENQ>→ | |
   | | ← <EOT> |
   | <SOH><ENQ>→ | |
   | | ← <EOT> |
   | <SOH><ENQ>→ | |
   | | ← <EOT> |
   | <EOT>→ | |

7. Time-outs:
   a. Turnaround Time-out Expired:
      | Transmitting Station | Receiving Station |
      |---|---|
      | <STX>text<ETX><BCC>→ | |
      | | ← <ACK> |
      | | <Turnaround Time-out> |
      | <ENQ>→ | |
      | | ← <ACK> |
   b. Turnaround Time-out Limit Exceeded:
      | Transmitting Station | Receiving Station |

```
 -continued
<STX>text<ETX> <BCC>→
                  ←* <ACK>
                 <Turnaround Time-out>
<ENQ>→
                  ← <ACK>
                 <Turnaround Time-out>
<ENQ>→
                  ←, <ACK>
                 <Turnaround Time-out>
<EOT>→
```

With further reference to FIG. 2, Gilbarco Inc., as previously mentioned, has been manufacturing and selling the Pump Controller Board 71 under part number T15841 for use in a number of products. As indicated herein, the Pump Controller 71 is also used in the present invention. Also, the present assignee, Gilbarco Inc., is presently manufacturing or is about to manufacture and sell the main power supply 61 under part number T16513, the main regulator 63 under part number T15857, the display regulator 65 under either part number Q11789 or T16394, the PPU front display 66 under either part number T15994 or T16598, the main front display 67 under part number T16226, the main rear display under part number T16226, the PPU rear display under either part number T15994 or T16598, and the blend select switches 47 as a membrane switch assembly under part number T16767-61.

Many advantages of the present invention have been previously discussed. Another advantage of the present invention in its various embodiments is that the two products to be blended are controlled along independent paths until the time of mixing in the manifold 39. In systems that do not provide independent product feed paths, leakage of one product into another product line due to seal leakage typically causes errors in the blend ratio, and also contamination of the ultimate blended product. For example, systems employing a single cam operated valve employing a rotatable disk like cam for controlling the flow of first and second products into a manifold or mixing chamber for obtaining a desired blend are susceptible to such seal leakage problems. Another advantage of the various embodiments of the present invention is that greater accuracy in blending is obtained by utilizing closed loop control in a joint manner for control of each one of the two valves 11, 13, in this example, in a substantially independent manner, for obtaining very accurate blending via the previously described algorithm which prevents race conditions that might otherwise occur in such a dual closed loop control scheme. Many other advantages and variations of the present embodiments of the invention may be apparent to one skilled in the art, wherein such variations or alternative embodiments are covered by the spirit and scope of the appended claims.

What we claim is:

1. A system for blending low and high octane gasoline, comprising:
   nozzle means for dispensing the blended gasoline, said nozzle means including blend manifold means having a first port for receiving low octane gasoline, a second port for receiving high octane gasoline, and a mixing chamber for blending received high and low octane gasoline together just prior to dispensing;
   a first flow path for delivery of said low octane gasoline from a source thereof to said first port;
   a second flow path, wholly independent of and isolated from said first flow path, for delivery of said high gasoline fuel from a source thereof to said second port;
   first flow control means responsive to a first control signal for controlling the rate of flow of gasoline in said first flow path;
   second flow control means responsive to a second control signal for controlling the rate of flow of gasoline in said second flow path;
   blend selection means for producing a blend set point signal indicative of a desired blend ratio of said low and high octane gasoline; and
   processor means responsive to the flow of said low and high octane gasolines for producing, after a predetermined initial volume of gasoline has been dispensed, said first and second control signals at any given time as a function of a comparision of the ratio of the actual accumulated volume of said low octane gasoline to said high octane gasoline, relative to a statistically determined ratio of the ideal volume of said low octane gasoline to said high octane gasoline for the total actual accumulated volume of the sum of the low and high octane gasoline at a given time, said processor means including means responsive to said blend set point signal for producing an idealized ratio equivalent to at a given time what the accumulated volumes of said low and high octane gasolines must be for providing said selected blend.

2. The blending system of claim 1, wherein said first flow control means includes a proportional flow control valve in said first flow path.

3. The blending system of claim 1, wherein said first flow control means includes a proportional solenoid valve including means to close said valve in the event of a system failure interrupting either (1) the supply of said first control signal to said valve, or (2) the supply of power to said valve.

4. The blending system of claim 1, wherein said second flow control means includes a proportional flow control valve in said second flow path.

5. The blending system of claim 1, wherein said second flow control means includes a proportional solenoid valve including means to close said valve in the event of a system failure interrupting either (1) the supply of said first control signal to said valve, or (2) the supply of power to said valve.

6. The blending system of claim 1, wherein said processor means includes:
   first flow meter means in said first flow path for producing first flow rate signals proportional to the rate of flow of said low octane gasoline;
   second flow meter means in said second flow path for producing second flow rate signals proportional to the rate of flow of said high octane gasoline;
   means responsive to said first and second flow rate signals for computing the ideal first and second flow rate signals for maintaining a desired blend; and
   means responsive to the error between the actual and ideal first and second flow rate signals for producing said first and second control signals at any given time in a manner for compensating for accurately for the errors in rate of flow, in order to accurately obtain the desired blend.

7. In a fluid blending system for blending first and second products together in a desired ratio prior to dispensing, the method comprising the steps of:
   providing a first flow path for said first product;
   providing a second flow path for said second product;
   isolating said first and second flow paths;
   producing first flow rate signals indicative of the actual flow rate of said first product at a given time;
   producing second flow rate signals indicative of the actual flow rate of said second product at a given time;
   statisically developing from the combination of a theoretical model for the operation of the system and data from the actual performance of said system on a real time basis, based upon total volume delivered at each measuring time, a predicted model of behavior for said system, for deriving idealized first and second flow rate signals having values for compensating for both preset and predicted future errors in said blend, for providing substantially the exact desired blend of said first and second products relative to the sum of the total accumulated volume thereof at a given time;
   calculating the error between the actaul and ideal ones of said first and second flow rate signals, respectively; and
   changing both simultaneously and individually, in an independent manner, over different time periods of a dispensing cycle, respectively, the rates of flow of said first and second products prior to the actual blending thereof, to compensate for the calculated errors thereof at any given time.

8. The method of claim 7, further including the step of mixing or blending together said first and second products after said error compensating step.

9. The method of claim 8, further including dispensing a desired amount of said blended products.

10. The method of claim 7, wherein the step of changing the rates of flow of said first and second products consists of proportionally changing the flow rates each from one rate to a corrected rate.

11. The method of claim 7, wherein the statistical development step includes assigning successive pulses of actual first and second flow rate signals to either one of the numerator or denominator of an idealized ratio thereof for a desired blend of the first and second products, the assignment being determined on a pulse by pulse basis regardless of association with either of said first or second products, in accordance with said predicted model of behavior and based upon the sum of the total accumulated first and second products at a given time, relative to what the rates of flow of said first and second products should be to the summed accumulation there of for obtaining the desired blend.

12. A system for blending first and second fluids together in desired ratio prior to dispensing, comprising:
   manifold means having a first port for receiving said first fluid, a second port for receiving said second fluid, a chamber for mixing said first and second fluids, and an outlet port for discharging therefrom the resultant blend of said first and second fluids;
   first valve means responsive to a first control signal for controlling the rate of flow of said first fluid from a source thereof to said first port of said manifold means;
   second valve means responsive to a second control signal for controlling the rate of flow of said second fluid from a source thereof to said second port of said manifold means; first flow meter means connected in series with said first valve means between said source of said first fluid and said first port of said manifold means, for producing first flow rate pulses proportional to the actual rate of flow of said first fluid;
   second flow meter means connected in series with said second valve means between said source of said second fluid and said second port of said manifold means, for producing second flow rate pulses proportional to the actual rate of flow of said second fluid;
   ratio tracker means responsive to the desired blend ratio, said first flow rate pulses, and said second flow rate pulses, for producing idealized first and second flow rate signals, for providing said desired blend of said first and second products relative to the sum of the total accumulated volume thereof at a given time;
   calculating means for determining the errors both between the actual and ideal first flow rate pulses, and between the actual and ideal second flow rate pulses; and
   control signal producing means responsive to said errors for changing said first and second control signals to compensate for the errors in the rates of flow of first and second fluids for obtaining the desired blend ratio thereof.

13. The blending system of claim 12, further including:
   said first valve means and first meter means in a first flow path for said first fluid; and
   said second valve means and second flow meter means in a second flow path for said second fluid, said first and second flow paths being independent of and isolated from one another.

14. A system for selective fluid blending and dispensing first and second products, comprising:
   first and second flow control valve means for individually controlling the rate of flow of said first and second products in response to first and second control signals, respectively;
   first and second flow meter means, connected in series with said first and second flow control valve means, respectively, for producing first and second flow rate signals indicating the rate of flow of said first and second products, respectively;
   dispensing means having first and second ports for receiving said first and second products, respectively, from said series connected first and second flow control valve means and first and second flow meter means, respectively, for both (1) blending together said first and second products, and (2) dispensing the resultant blend; and
   closed loop control means including blend selection means for selectively producing a blend signal indicative of a desired blend or mixture ratio of said first and second products for dispensing, blended product flow rate selection means for selectively changing at any given time as demanded by a user product flown rate for dispensing and processing means responsive to said blend signal, a total flow rate signal produced by said blended product flow rate selection means, and said first and second flow rate signals, for producing said first and second control signals for operating said flow control valve means to jointly change the rates of flow of said first and second products at the same time in a first mode of operation, respectively, over a given dispensing cycle, prior to actual blending of said first and second products, for both maintaining the desired blend, and desired blended product flow rate at any given time.

15. The blending system of claim 14, wherein said flow control valve means includes:
first and second proportional solenoid valve means responsive to said first and second control signals, respectively, produced by said processing means for directly controlling the rates of flow of said first and second products, respectively, for maintaining the desired blend; and
said first and second proportional solenoid valve means each including means for closing said valve means in the event of a loss of power thereto.

16. The belnding system of claim 14, wherein said processing means further includes:
blend ratio control means, for controlling the initiation of a blending cycle, by producing said first and second control signals to (1) start initial flows of said first and second products each at a predetermined value, and (2) thereafter ramp up the flow rate for the dominant one of the first and second products to provide a controlled maximixed flow; and
volume ratio control means for taking over from said blend ratio control means, the production of said first and second control signals after a predetermined volume of said first and second products has been dispensed, as a function of the accumulated volume of each one of said first and second products relative to a statistically determined volume ratio of said first and second products for the selected blend.

17. The blending system of claim 15, wherein said first and second flow control valve means each include a proportional flow control valve.

18. The blending system of claim 15, wherein said first and second flow control valve means each include a proportional solenoid flow control valve.

19. The blending system of claim 16, wherein said processing means further includes means for terminating said instantaneous blend ratio control means after said predetermined values of said first and second products have been dispensed.

20. The blending system of claim 15, wherein said flow meter means includes first flow meter means connected in series with said first control valve means for providing said first flow rate signal, and second flow meter means connected in series with said second control valve means for providing said second flow rate signal.

21. The blending system of claim 14, wherein said dispensing means includes:
blend manifold means for receiving said first and second products from the series connected flow control valve means and flow meter means, and mixing or blending the first and second products together, and providing the same as a blended product; and
nozzle means receiving the blended product from said blend manifold means, for providing selective dispensing of the blended product.

22. The blending system of claim 14, wherein said processing means further includes a microprocessor-based system.

23. The blending system of claim 14, wherein said blend selection means includes a plurality of pushbutton means each of which designates a different blend, whereby depression of any one of said plurality of pushbutton means produces a blend signal indicative of the desired blend.

24. A system for selectively blending and dispensing fluid products, comprising:
first flow control valve means, responsive to a first control signal, for directly controlling the flow rate of a second product;
second flow control valve means, responsive to a second control signal, for directly controlling the flow rate of a second product;
first positive displacement flow meter means connected in series with said first flow control valve means, for producing a first flow rate signal indicative of the flow rate of said first product;
second positive displacement flow meter means connected in series with said second flow control valve means, for producing a second flow rate signal indicative of the flow rate of said second product;
dispensing means connected for receiving said first and second products from said series connected first flow control valve means and first flow meter means, and said series connected second flow control valve means and second flow meter means, respectively, for sequentially blending and selectively dispensing the blended said first and second products, the flow rates thereof determining the ratio of the first product to the second product in the resilient blend of the two being dispensed;
control means including blend selection means for producing a blend signal indicative of a desired blend of said first and second products, and processing means responsive to said blend signal, and said first and second flow rate signals, for producing said first and second control signals for simultaneously controlling in a closed loop manner said first and second flow control valve means for changing the relative rates of flow of said first and second products for maintaining the mixture ratio of the blend of the first and second products being dispensed prior to the actual blending thereof; and
said dispensing means including blend manifold means for blending or mixing said first and second products together, and nozzle means connected to said blend manifold means for receiving the blended product therefrom and providing selective dispensing of the blended fuel.

25. The system of claim 24, wherein said first and second flow control valve means each include a proportional flow control valve.

26. The system of claim 24, wherein said first and second flow control valve means each include a proportional solenoid flow control valve.

27. The system of claim 26, wherein said proportional solenoid flow control valve includes means for closing said valve in the event of a malfunction.

28. The system of claim 24, wherein said processing means includes a microprocessor based system.

29. The system of claim 24, wherein said blend selection means includes a plurality of switch means, each one being associated with and designated for selecting a different blend of said first and second products during each cycle of operation of said system, the actuation of any one of said plurality of switch means producing a blend signal indicative of the associated blend.

30. The system of claim 24, wherein said first and second products consist of low and high octane gasoline, respectively.

31. The fuel dispensing system of claim 24, wherein said processing means further includes:
means for translating the accumulated volume of blended fuel of the first and second fuels into two related theoretical ideal product volumes, respectively, indicative of the volumes of the first and second products hired for obtaining said desired blend without error;

error determining means for calculating the differences between the actual and ideal accumulated volumes of said first fuel, and the actual and ideal accumulated volumes of said second fuel, for obtaining a first fuel error, and a second fuel error, respectively; and correcting means responsive to said first fuel error and said second fuel error for changing said first and second control signals, respectively, to compensate for these errors to maintain the desired blend.

* * * * *

UNITED STATES PATENT AND TRADEMARK OFFICE
CERTIFICATE OF CORRECTION

PATENT NO. : 4,876,653
DATED : October 24, 1989
INVENTOR(S) : John S. McSpadden; Russel D. Leatherman; and Harold Young It is certified that error appears in the above-identified patent and that said Letters Patent is hereby corrected as shown below: On the title page add the name of the assignee as follows: Gilbarco Inc.
Greensboro, N.C.

Column 5, line 53, delete "5".

Column 6, line 16, delete "5".

Column 7, line 2, change "83" to --79-- and "85" to --81--.

Column 12, line 36, "2st" should be --2nd--.

Column 13, line 32, change "0.X6" to --0.06--.

Column 19, line 29, change "21I" to --21H--.

Column 21, line 6, change "BRDY" to --$\overline{BRDY}$--, and "BSTB" to --$\overline{BSTB}$--.

Column 21, line 67, change "446" to --447--.

Column 21, line 43, "=" should be --+--; line 59, "d" should be --a--.

Column 23, line 46, "=" should be --+--.

Column 24, line 50 change "574" to --573--.

Column 24, line 51, delete "and 576".

line 54 after "respectively." insert --The signals "STP1 Control" and "STP2 Control" return to main supply 62 via return line 564. Power is delivered from main supply 62 to relays 568 and 570 via line 571.--

UNITED STATES PATENT AND TRADEMARK OFFICE
CERTIFICATE OF CORRECTION

PATENT NO. : 4,876,653
DATED : October 24, 1989
INVENTOR(S) : John S. McSpadden; Russel D. Leatherman; and Harold Young It is certified that error appears in the above-identified patent and that said Letters Patent is hereby corrected as shown below:

Column 26, line 1 change "Said" to --Set--.

Column 27, line 31, "7" should be --71--.

In The Claims:

Claim 6, line 16, delete "accu"; line 17, delete "rately for".

Claim 16, line 1, "belnding" should be --blending--.

Claim 24, line 26, "resilient" should be --resultant--.

Claim 31, line 7, "hired" should be --required--.

Signed and Sealed this

Ninth Day of April, 1991

Attest:

HARRY F. MANBECK, JR.

*Attesting Officer*  *Commissioner of Patents and Trademarks*